(12) United States Patent
Toy et al.

(10) Patent No.: US 12,586,483 B2
(45) Date of Patent: Mar. 24, 2026

(54) MODULAR CIRCUIT CARD ASSEMBLY FOR ADVANCED TRAINING APPLICATIONS

(71) Applicant: Raytheon Company, Arlington, VA (US)

(72) Inventors: Gregory K. Toy, Tucson, AZ (US); Alexandra Beresford, Tucson, AZ (US); Joshua J. Johnson, Marana, AZ (US); Christopher Velez, Tucson, AZ (US); Maxwell Kirkpatrick, Lawrence, MA (US)

(73) Assignee: Raytheon Company, Arlington, VA (US)

( * ) Notice: Subject to any disclaimer, the term of this patent is extended or adjusted under 35 U.S.C. 154(b) by 749 days.

(21) Appl. No.: 17/526,568

(22) Filed: Nov. 15, 2021

(65) Prior Publication Data

US 2023/0154349 A1 May 18, 2023

(51) Int. Cl.
| | |
|---|---|
| *G09B 9/00* | (2006.01) |
| *G06F 18/214* | (2023.01) |
| *G06V 20/20* | (2022.01) |

(52) U.S. Cl.
CPC ............. *G09B 9/00* (2013.01); *G06F 18/214* (2023.01); *G06V 20/20* (2022.01)

(58) Field of Classification Search
CPC .......... G06F 18/214; G06V 20/20; G09B 9/00
See application file for complete search history.

(56) References Cited

U.S. PATENT DOCUMENTS

| | | | |
|---|---|---|---|
| 6,071,191 | A | 6/2000 | Takeda et al. |
| 6,676,520 | B2 | 1/2004 | Nishiumi et al. |

(Continued)

FOREIGN PATENT DOCUMENTS

| | | |
|---|---|---|
| CN | 108694871 A | 10/2018 |
| CN | 110688769 | 1/2020 |
| CN | 112351236 A | 2/2021 |
| JP | 4142061 B2 | 8/2008 |
| KR | 101498610 B1 | 3/2015 |
| TW | 201828205 A | 8/2018 |

(Continued)

OTHER PUBLICATIONS

Response to Taiwan Office Action (with Machine English Translation) dated Jun. 26, 2023 filed on Aug. 30, 2023 for Taiwan Application No. 111129724; 8 Pages.

(Continued)

*Primary Examiner* — Kesha Frisby
(74) *Attorney, Agent, or Firm* — Schwegman Lundberg & Woessner, P.A.

(57) ABSTRACT

An assembly comprises, in operable communication, a processor, a communications system, a sensory subsystem, a health management system, and a security system, where the assembly is configured to interface between a simulation system and a computer system that controls the simulation system. The communications system controls communications between the simulation system and the computer system. The sensory subsystem provides commands to the simulation system to enable it to provide a simulated user experience to the user that engages one or more senses of the user with a simulation that the respective one or more senses can detect. The health management system monitors health event information relating to one or more environmental characteristics in which the simulation system is operating. The security system monitors security events associated with the assembly, the security events related to at least one of physical and logical intrusion into the assembly.

21 Claims, 9 Drawing Sheets

(56)                References Cited

U.S. PATENT DOCUMENTS

| | | | |
|---|---|---|---|
| 6,881,147 | B2 | 4/2005 | Naghi et al. |
| 7,507,089 | B2 | 3/2009 | Jones et al. |
| 7,927,102 | B2 | 4/2011 | Jones et al. |
| 8,117,364 | B2 | 2/2012 | Nielsen et al. |
| 8,662,892 | B2 | 3/2014 | McCormack et al. |
| 8,727,882 | B2 | 5/2014 | Lum et al. |
| 10,009,046 | B1 | 6/2018 | Armstrong et al. |
| 10,137,365 | B2 | 11/2018 | Ikeda |
| 10,198,957 | B2 | 2/2019 | Shimata et al. |
| 10,322,336 | B2 | 6/2019 | Tran et al. |
| 10,340,960 | B2 | 7/2019 | Armstrong et al. |
| 10,773,156 | B2 | 9/2020 | Colenbrander |
| 10,788,889 | B1 | 9/2020 | Godina et al. |
| 10,996,742 | B2 | 5/2021 | Connellan et al. |
| 2005/0170889 | A1 | 8/2005 | Lum et al. |
| 2005/0221895 | A1 | 10/2005 | Lum et al. |
| 2010/0271394 | A1 | 10/2010 | Howard |
| 2011/0267190 | A1 | 11/2011 | Payson et al. |
| 2018/0050267 | A1 | 2/2018 | Jones |
| 2018/0114039 | A1 | 4/2018 | Sion |
| 2018/0247453 | A1 | 8/2018 | Nakashima et al. |
| 2019/0281259 | A1 | 9/2019 | Palazzolo |
| 2021/0116197 | A1 | 4/2021 | Deng et al. |
| 2021/0199408 | A1 | 7/2021 | Reed et al. |

FOREIGN PATENT DOCUMENTS

| | | |
|---|---|---|
| TW | 202321959 | 6/2023 |
| WO | 2023229617 | 11/2023 |

OTHER PUBLICATIONS

NTSA, "Army Shines Spotlight on Cyber Training Growth;" Showdaily; I/ITSEC 2017 Official Daily News Digest; Nov. 27, 2017; 32 Pages.

Rashid, "Use of VR Technology and Passive Haptics for MANPADS Training System;" Thesis and Dissertation from Calhoun Institutional Archive of the Naval Postgraduate School; Sep. 2017; 124 Pages.

Raytheon Company, "Raytheon's Modeling and Simulation, Supporting All Phases of System Development, Test and Training;" Highlighting Raytheon's Technology in Technology Today, Issue 1; Jan. 2013; 64 Pages.

Rozman, "The Synthetic Training Environment;" Published by the Association of the United States Army; Dec. 2020; 11 Pages.

Straus et al., "Collective Simulation-Based Training in the U.S. Army;" User Interface Fidelity, Costs, and Training Effectiveness; Published by the RAND Corporation; Jan. 2019; 172 Pages.

Uppal, "Synthetic Training Environment (STE) White Paper;" Combined Arms Center—Training (CAC-T); Created Oct. 2, 2020; 6 Pages.

U.S. Army, "Common Operating Environment (COE);" PowerPoint Presentation Approved for Public Release; Oct. 2015; 28 Pages.

U.S. Army Acquisition Support Center (USAASC), "Synthetic Training Environment (STE);" Retrieved from asc.army.mil/web/portfolio-item/synthetic-training-environment-ste; Retrieved on Oct. 18, 2021; 3 Pages.

U.S. Army Combined Arms Center (USACAC), "Synthetic Training Environment (STE);" Statement of Need; Retrieved Oct. 18, 2021; 29 Pages.

2nd Taiwan Office Action (with English Translation) dated Oct. 27, 2023 for Taiwan Application No. 111129724; 6 Pages.

"Taiwanese Application Serial No. 111129724, Decision of Rejection mailed Oct. 27, 2023", With English Machine Translation, 8 pgs.

"International Application Serial No. PCT US2022 038760, International Search Report mailed Feb. 15, 2024", 3 pgs.

"International Application Serial No. PCT US2022 038760, Written Opinion mailed Feb. 15, 2024", 10 pgs.

Taiwan Office Action (with Machine English Translation) dated Jun. 26, 2023 for Taiwan Application No. 111129724; 30 Pages.

"Taiwanese Application Serial No. 111129724, Office Action mailed Dec. 19, 2024", With English Machine Translation , 26 pgs.

"European Application Serial No. 22940516.2, Response filed Dec. 6, 2024 to Communication pursuant to Rules 161(1) and 162 EPC mailed Jun. 25, 2024", 24 pgs.

MODULAR CIRCUIT CARD ASSEMBLY FOR ADVANCED TRAINING APPLICATIONS

FIELD

Embodiments of the disclosure generally relate to devices, systems, and methods for simulation of situations for tactical, maintenance, and training purposes. More particularly, the disclosure describes embodiments relating to devices, systems, and methods for providing a modular, configurable interface configured to provide a universal data and control interface between various computer systems running simulation scenarios and various types of physical training devices and simulation systems that need to interact with that computer system.

BACKGROUND

In environments such as the military or in aerospace, training users often requires the use of training simulation systems, particularly in simulating situations that can involve interactions of humans with dangerous, costly, inconvenient, or difficult to replicate devices and systems, such as weapons systems, aircraft, sea vessels, spacecraft, etc. There are many types of simulation systems now in use, including but not limited to air traffic control (ATC) simulators, radar simulators, flight simulators, tank simulators, weapons simulators, ship bridge simulators, driving simulators, marksmanship simulators, rocket simulators, and the like. There are even training simulation systems to simulate human interaction with other humans, such as to perform surgery and other medical/dental procedures. An advantage of simulation systems is that they enable users being trained to experience and respond to situations (and/or operate devices and equipment) that would otherwise be difficult to recreate or utilize for training purposes, because of constraints such as limited budgets, limited resources, risks involved, time, availability of equipment/locations, and difficulty to recreate on-demand, in the real world, a type of situation or configuration for which training is needed.

Virtual reality (VR) is an interactive computer-generated experience taking place within a simulated (virtual) environment. A VR system typically incorporates auditory, visual and sensory feedback. Many VR systems use head mounted displays that include virtual reality headsets that include a display and audio features configured to generate realistic images, sounds and other sensations that simulate a user's physical presence in a virtual environment. A person using a virtual reality system is able to look around the artificial world, move around in it, and interact with virtual features or items in such environment. VR systems also can transmit vibrations and other sensations to the user through a controller that also accepts inputs and instructions from the user, such as moving forward or backward, moving slow or fast, turning, touching, grabbing, controlling an object, and the like, using designated features on the game controller, such as buttons, joystick, icons, etc. Controllers provide input to a VR system from a user activating different buttons/dials, by plugging into one of a console's (e.g., a headset) controller ports or wirelessly pairing the controller with the console system/VR system. Examples of controllers can include directional pads, multiple buttons, analog sticks, joysticks, motion detection, touch screens, all of which require activation by a user's hands.

SUMMARY

The following presents a simplified summary in order to provide a basic understanding of one or more aspects of the embodiments described herein. This summary is not an extensive overview of all of the possible embodiments and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

With the increasing availability of VR systems and increasing sophistication of commercial gaming systems, it has become more commonplace to be able to train users in various fields with remarkably realistic and sophisticated simulation systems. For example, the U.S. military currently uses various types of simulator systems to train personnel in the use of various weapons systems. FIGS. 1A and 1B are illustrative block diagrams 100A, 100B, respectively of an exemplary prior art virtual reality training system usable to simulate operation of the U.S. Army's Stinger® missile, and FIG. 2 is an exemplary illustration of an actual user undergoing training with a simulation system similar to that of FIGS. 1A-1B. The exemplary system 100A provides a simulation and virtual environment 102, which can include simulation of various scenes, three dimensional (3D) models of targets to be shot (e.g., helicopters, aircraft) and Stinger missiles to be fired, simulated weather and terrain imagery, simulation sensors, firing sequences, etc.

Stinger is a type of Man-portable air defense system (MANPADS), which include surface-to-air missiles that can be fired by an individual or a small team of people against aircraft. These weapon systems often are described as shoulder-fired anti-aircraft missiles. In the simulator systems of FIGS. 100A and 100B, the headphones/speakers 104 provide audio information and simulated sounds of an environment, targets, and weapons to a user who is simulating the operation of a STINGER missile in a training environment. The VR headset and headtracker 106 can include features such as a front-facing camera, one or more controllers, and tracking sensors, to help facilitate the simulation. Hand tracking features 108 can be implemented various ways, such as with wearable components (e.g., that could include finger tracking), via buttons to simulate finger movement, via a headset mounted motion controller 108, and also via a custom trigger 116 (FIG. 1B) and/or a Stinger controller 118, to help track user orientation, user hand position, provide user controls, and provide haptic feedback, such as vibrations.

In addition, the Stinger simulation device 120 helps to provide passive haptics that help to simulate the weight, heft, and physical feel of using a Stinger missile during a simulation/training exercise, as shown in the illustration 200 of FIG. 2. A separate computer system associated with a control display 110 and keyboard, enables the creation of simulation scenarios that can be provided to the simulation environment 102 and can enable another user (not shown) at the computer system to observe the user 114 performing the simulation and/or to control the experience the user 114 has during the simulation.

Many different types of simulators and systems for different weapons can be used to provide various types of synthetic training environments, using diverse types of weapons or other devices, as will be appreciated, both with and without virtual reality environments or computer control. As simulation systems increase in popularity in some applications, such as for military training, there has been a desire to ensure that training scenarios can be created and used with multiple different types of training hardware and systems. However, many currently developed simulation systems use proprietary systems and hardware, especially hardware designed to provide haptics associated with specific weapons, and often these systems are not interoperable with each other. Thus, it can be difficult to integrate and use together multiple different simulation systems to train for varied and complex situations that users may encounter in the real world, without extensive re-engineering and programming, to ensure that commands are properly converted for use to a particular type of simulation system.

In contrast, commercial systems used for recreational purposes, such as gaming systems like Microsoft's Xbox or Sony's PlayStation, can provide more flexibility to be used with a wider variety of hardware, and are far less costly, but such systems lack the robustness, reliability, and secure features needed to operate in demanding environments and applications such as military training and simulations. Commercial devices have a price and availability advantage, but they also lack features necessary in industrial and/or military applications, such as cybersecurity features, encryption, intrusion protection, ability to operate in challenging/rugged industrial and/or military environments (e.g., temperature extremes, shock, vibration, etc.), and ability to operate in classified and/or closed spaces. Commercially available simulation systems (and also many known military simulation systems) do not monitor or track environmental factors and conditions to which the simulation device has been exposed, nor do they tend to have the same reliability requirements as more rugged systems required in some applications.

At least some embodiments herein attempt to resolve at least some of these concerns.

In one aspect, an assembly is provided, comprising a processor, a communications system, a sensory subsystem, a health management system, and a security system. The processor is in operable communication with a memory, the memory storing instructions for operation of the processor, the processor configured to convert first instructions received from a computer system into control signals to operate a simulation system in accordance with a first simulation scenario, wherein the processor is responsive to user actions and is operable to control the first simulation scenario running on the simulation system based at least in part on the user actions. The communications system is in operable communication with the processor and the computer system, the communication system configured for controlling communications between the simulation system and the computer system and configured to provide at least one of wired and wireless communication between the assembly and the computer system. The sensory subsystem is in operable communication with the processor, the sensory subsystem configured to provide commands to the simulation system to enable the simulation subsystem to provide a simulated user experience to the user, wherein, the simulated user experience is configured to engage one or more senses of the user with a simulation that the respective one or more senses can detect. The health management system is in operable communication with the processor and is configured to monitor health event information relating to one or more environmental characteristics in which the simulation system is operating. The security system is in operable communication with the processor and is configured for monitoring security events associated with the assembly, the security events related to at least one of physical and logical intrusion into the assembly. The assembly is configured to interface between the simulation system and the computer systems.

In some embodiments, the assembly further comprises a log configured to store event information the stored event information comprising information associated with at least one of the simulation events, health events, and security events. In some embodiments, the processor is configured to provide stored event information in the log to the computer system for analysis of the first simulation scenario. In some embodiment, the processor is configured to receive from the computer system second instructions for operating the simulation system in accordance with a second scenario, wherein the second scenario is created based at least in part on the analysis of the stored simulation information in the log that was provided to the first computer system. In some embodiments, the processor is configured to provide stored security event information in the log to the computer system for analysis relating to detection of intrusion into at least one of the assembly and communications to and from the assembly.

In some embodiments, the processor is configured to provide stored health event information in the log to the computer system for analysis relating to detection of one or more health events associated with usage of the simulation system. In some embodiments, the assembly is configured to be disposed within a simulation device of the simulation system. In some embodiments, the simulation system comprises at least one of a virtual reality (VR) system, an augmented reality system, and a system operable within a synthetic training environment (STE). In some embodiments, the communications subsystem is configured to be switchable between wired and wireless communication. In some embodiments, the assembly is contained within a first device of the simulation system and wherein the communications system of the assembly is operably coupled to a second device distinct from the first device, wherein the communications system is configured to enable the second device to have pass through communications with the computer system. In some embodiments, the communications system is operably coupled to the computer system via a first wired connection and the second device is connected to the communications system so as to ensure that communications from the second device are to the computer system are provided only via the first wired connection.

In some embodiments, the security system comprises a reverse engineering protection system (REPS), the REPS configured to protect the assembly from at least one of physical intrusion into the assembly and a logical intrusion into the assembly. In some embodiments, the security system comprises a hardware security method subsystem that comprises at least one of an encryption system, an authentication system, and a tamper detection system. In some embodiments, the security system is configured to cooperate with the processor and the communications system to provide a Root of Trust (ROT) for the assembly.

In some embodiments, the security system is configured to cooperate with the processor and the communications system to provide a Root of Trust (RoT) for the assembly.

In another aspect, a method is provided. An assembly is provided, the assembly configured as an interface between a computer system and a simulation system, the assembly configured to be physically part of the simulation system. Using the assembly, first instructions received from the computer system are converted into control signals to operate the simulation system in accordance with a first simulation scenario, wherein the simulation system is responsive to user actions and is configured to provide a simulated user experience to the user, wherein, the simulated user experience is configured to engage one or more senses of the user with a simulation that the respective one or more senses can detect. Using the assembly communications between the simulation system and the computer system are configured to provide at least one of wired and wireless communication between the simulation system and the computer system. Events associated with the simulation system are monitored, the events comprising at least one of: health event information relating to one or more environmental characteristics in which the simulation system is operating; and security events associated with the assembly, the monitoring configured to detect at least one of physical and logical intrusion into the assembly.

In some embodiments, the monitoring of events takes place during at least one of operation of the simulation system and during times when the simulation system is not operating. In some embodiments, the method further comprises operating the simulation system in accordance with a second scenario, wherein the second scenario is created based at least in part on an analysis of the monitored event information.

In a further aspect a means for interfacing between a simulation system and a computer system is provided. The means for interfacing comprises means for converting first instructions received from the computer system into control signals to operate the simulation system in accordance with a first simulation scenario, means for controlling communications between the simulation system and the computer system, means for providing commands to the simulation system to enable the simulation subsystem to provide a simulated user experience to the user, means for monitoring health event information relating to one or more environmental characteristics in which the simulation system is operating, and means for monitoring security events associated with the assembly.

The means for converting is responsive to user actions and is operable to control the first simulation scenario running on the simulation system based at least in part on the user actions. The means for controlling communications is further configured to provide at least one of wired and wireless communication between the assembly and the computer system. The simulated user experience is configured to engage one or more senses of the user with a simulation that the respective one or more senses can detect. The security events relate to at least one of physical and logical intrusion into the means for providing an interface, and for protecting the assembly and communications to and from the assembly from intrusion.

In some embodiments, the means for interfacing further comprises means for storing event information, the stored event information comprising information associated with at least one of the simulation events, health events, and security events.

It should be appreciated that individua 1 elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims included herein. Details relating to these and other embodiments are described more fully herein.

BRIEF DESCRIPTION OF THE DRAWINGS

The advantages and aspects of the described embodiments, as well as the embodiments themselves, will be more fully understood in conjunction with the following detailed description and accompanying drawings, in which.

The drawings are not to scale, emphasis instead being on illustrating the principles and features of the disclosed embodiments. In addition, in the drawings, like reference numbers indicate like elements.

DETAILED DESCRIPTION

Figures 1A, 1B:
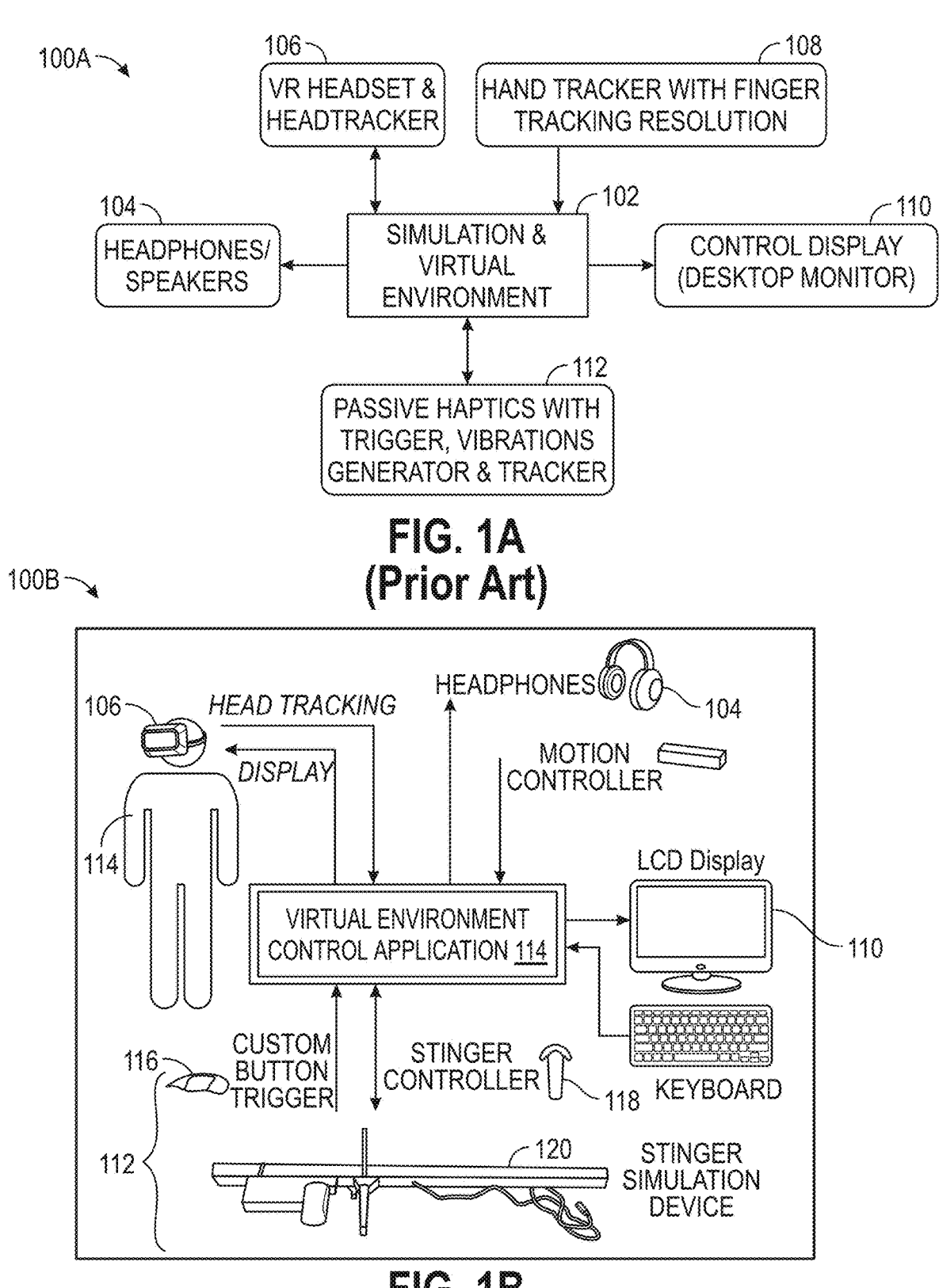
FIG. 1A is a block diagram of a first prior art simulation system, in accordance with one embodiment.
FIG. 1B is a block diagram of a second prior art simulation system, in accordance with one embodiment.

Before describing details of the particular systems, devices, and methods, it should be observed that the concepts disclosed herein include but are not limited to a novel structural combination of components and circuits, and not necessarily to the particular detailed configurations thereof. Accordingly, the structure, methods, functions, control and arrangement of components and circuits have, for the most part, been illustrated in the drawings by readily understandable and simplified block representations and schematic diagrams, in order not to obscure the disclosure with structural details which will be readily apparent to those skilled in the art having the benefit of the description herein.

Unless specifically stated otherwise, those of skill in the art will appreciate that, throughout the present detailed description, discussions utilizing terms such as "opening", "configuring," "receiving,", "detecting," "retrieving," "converting", "providing,", "storing," "checking", "uploading", "sending,", "determining", "reading", "loading", "overriding", "writing", "creating", "including", "generating", "associating", and "arranging", and the like, refer at least to the actions and processes of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The disclosed embodiments are also well suited to the use of other computer systems such as, for example, optical and mechanical computers. Additionally, it should be understood that in the embodiments disclosed herein, one or more of the steps can be performed manually.

The following detailed description is provided, in at least some examples, using the specific context of simulation systems for military environments, but those of skill in the art will appreciate that the detailed description includes examples that are applicable to many different environments and contexts where simulation systems may be used, including simulations of actions and scenarios associated with commercial, industrial, medical, scientific, research, recreational, and/or gaming environments. Further, terms such as "training," "trainer," "synthetic training environment," "simulated training environment," "virtual environment," "virtual trainer," and the like, may be used interchangeably and refer at least to a controlled training environment where weapons, replica weapons, and/or or simulated weapons can be used, including weapons, replica weapons, and/or simulated weapons used with "blanks," simulated ammunition, virtual ammunition, or no ammunition, as well as controlled training environments where one or more user interact with others who may be using such weapons, replica weapons, and/or simulated weapons.

The following terminology definitions (in alphabetical order) may be helpful in understanding one or more of the embodiments described herein and should be considered in view of the descriptions herein, the context in which they appear, and knowledge of those of skill in the art:

"Audio" refers at least to signals, sounds, noises, and the like, that are provided to one or more users of a simulation system as part of the simulation, whether in the operating environment, though headphones or a headset, or even through the equipment being used, where the sounds can be made in multiple ways, included but not limited to simulated sounds, actual sounds, sounds generated in response to a control signal, sounds generated in response to a user action, and sounds originating from other users.

"Augmented reality" may be considered to be a form of virtual reality (VR) and refers at least to systems configured to layers virtual information over a live camera feed into a headset or through a portable device giving the user the ability to view three-dimensional images that appear in a real world setting but which are entirely simulated. Like VR, augmented reality involves a computerized simulation, but augmented reality supplements, replaces, and/or augments certain real-world elements with a computer-generated simulation of sensory input such as video, sound, graphics, and/or tactile feedback. For example, such a computer-generated simulation may be overlaid onto a computer reproduction of the real-world environment, such as a text, a graphic, symbol, image, and/or a combination thereof, among others.

"Big Data" at least refers to refers to analytical techniques that make use of trend identification in sufficiently large data sets. Two techniques used for Big Data analytics are Clustering and Prediction. Clustering is a process of grouping like records or objects, frequently using Machine Learning. Prediction is the process of using similarity identified through clustering to predict potential future effects and benefits.

"Closed Area" at least refers to defined areas or locations where access is controlled to preclude unauthorized access. Such control can be accomplished through various ways, including but not limited to the use of a cleared employee and/or an access control device or system. In a closed area, access generally is limited to authorized persons who have an appropriate security clearance and a need-to-know for the classified material/information within the area, and persons without the appropriate level of clearance and/or need to know are escorted at all times by an authorized person. Closed areas are accorded supplemental protection during non-working hours with appropriate locks and appropriate access control system. In some embodiments herein, types of communications may be preferred for closed areas, such as only wired communications and no wireless communications.

"Cloud computing" at least refers to on-demand network access to a shared pool of configurable computing resources (e.g., networks, servers, storage, applications, and services) that can be rapidly provisioned and released with minimal management effort or service provider interaction.

"Communications network" refers at least to methods and types of communication that take place between and among components of a computer system, such as a computer-enabled simulation system, including but not limited to wired communication, wireless communication (including radio communication, Wi-Fi networks, BLUETOOTH communication, etc.), cloud computing networks, networks communicating using various network protocols known in the art, military networks (e.g., Department of Defense Network (DDN)), and any means of sending data or signals between two devices.

"Environment" refers at least to an operating environment in which a simulator is used, and can refer to or include one or more types of features of that environment, including but not limited to security status (e.g., closed environments), physical location (e.g., indoors in a controlled environment, outdoors, and/or a mix), operational status (e.g., training, maintenance, live interactions, simulated interactions), and/or physical environmental conditions (e.g., temperature, humidity, motion, shock, vibration, pressure). Environment also at least refers to texture or detail of the natural domain that may be part of a given simulation, that is, terrain relief, weather, day, night, terrain cultural features (cities or farmland), sea states, etc.; and the external objects, conditions, and processes that influence the behavior of a system.

"Haptics" refers at least to devices and systems that incorporate or relate to a sense of touch or a tactile feel, whether actively (e.g., through sensors or other components) or passively (by virtue of having a size, weight, texture, etc., that can be perceived during use). Haptics can be incorporated via devices having built in tactile feedback components, and in some instances, a device or system having haptics can be responsive to computerized control signals the control the operation of one or more haptic components. In at least some embodiments, haptics refers to all the physical sensors that provide a sense of touch at the skin level and force feedback information from muscles and joints.

"Hardware Security Method" (HSM) at least refers to subsystems and/or devices that are incorporated into and/or connected to hardware (but which optionally can operate in conjunction with some programming or software) that are configured to detect and/or address security issues, such as at least one of physical or logical intrusion, at least one of logical and physical reverse engineering attempts, at least one of physical and logical tampering, etc. Hardware security methods can be implemented in various ways depending on need. For example, a first type of sensor can be used to detect/track an external air or water intrusion into a hermetically sealed compartment and thus can help implement features such as tamper detection, for at least one type of HSM in accordance with the embodiments herein. Another type of sensor can detect/track if/when ambient light exceeding a certain threshold, has impinged on it, also indicative of a possible intrusion (e.g., cover or lid to a device was removed at one point and later replaced). Magnetic contact switches can be used to detect/track if an opening between two contact points takes place, thus breaking up the magnetic signal. Various types of electronic alarm systems can be configured to trigger and/or record an event, based on some action that causes a change to a monitored electrical value (e.g., some action effectively causes a break in continuity of an electrical circuit, triggering an alarm, etc.). Those of skill in the art will appreciate that many other types of intrusion detection systems (including but not limited to motion detection devices, infrared sensors, seismic sensors, pressure sensors, etc.) can be configured as part of an HSM. In some embodiments, depending on the type of hardware security method being implemented, addition types of devices, such a commercially available hardware security module chips, are usable as part of an HSM to help provide authenticated, encrypted communications, which can implement a further type of HSM to help implement logical intrusion attempts, such as hacking. Another way to help implement detection of logical intrusion attempts is via devices that are configured to monitor communications (e.g., monitor network traffic) to detect anomalies.

"Interoperability" at least refers to the ability of a model or simulation to provide services to and accept services from other models and simulations, and to use these exchanged services to operate effectively together.

"Pass Through Communication" at least refers to a communication that is able to be transmitted from a sending device or system to a receiving device or system through an intermediary device or system, where the communication simply "passes through" the intermediary device so as to be substantially unchanged, on its way to the receiving device or system. The sending device itself can comprise a subsystem to convert the communication or signal into a form so that the intermediary device can pass it through (e.g., a USB dongle able to receive wireless or Bluetooth communications from a device, such as a wireless mouse or tracking puck, etc., as is known in the art for so-called "USB passthrough"). Pass through communications effectively operate, as if the sending system was in direct communication with the receiving system to communicate the signal. The intermediary device or system provides a conduit or connection enabling the transmission of signals or communications. In some embodiments, a given connection for pass through communications also can be configured to provide other features (e.g., charging of a device)

"Simulation system" at least refers to a device, computer program, or system that performs simulation, including but not limited to a machine, apparatus, or system that mimics or represents some real world condition, or phenomenon and/or or a system, developed for multiple purposes, including but limited to purposes such as training, field exercises, so-called "war games," maintenance, recreation, research and development (R&D), analysis, test, and evaluation.

"Synthetic Environment" refers at least to the integrated set of data elements that define the environment within which a given simulation application operates. The data elements include information about the initial and subsequent states of the terrain including cultural features, and atmospheric and oceanographic environments throughout an exercise. The data elements include databases of externally observable information about instantiable entities and are adequately correlated for the type of exercise to be performed. Synthetic environments also are known by terms such as "virtual world."

"Synthetic Training Environment" (STE) refers at least to a single environment that will allow users, such as soldiers, to train together (potentially integrating both synthetic environments and real-world environments), advantageously, from anywhere in the world, as part of the same training experience. In some embodiments, STE is implemented to blend multiple types of technologies during a simulation exercise, such as augmented reality, virtual reality, artificial intelligence and big data—to connect users and allow them to perform actions (e.g., training) in new and different ways.

"Virtual Reality" (VR) at least refers to an interactive computer-generated experience taking place within a simulated environment, including the computer-generated simulation of a three-dimensional image or environment that can be interacted with in a seemingly real or physical way by a person using special electronic equipment, such as a helmet with a screen inside, gloves fitted with sensors, a custom controller, a tool, a weapon, a user input device (e.g., keyboard, joystick, trackball, mouse, etc.), or other appropriate equipment, including external sensors that can detect user movement and position. Virtual reality at least includes an artificial environment which is experienced through sensory stimuli (such as sights and sounds) provided by a computer or other appropriate devices, wherein in at least some instances, a user's actions at least partially determine what happens in the environment. In some embodiments, virtual reality is implemented via a computer technology that replicates an environment, which may be a simulation of a real life environment or an imaginary environment and simulates a user's presence in the environment allowing the user to interact with the environment. Virtual reality environments can be provided in numerous ways, including via display a computer display or with a special virtual reality headset worn over the user's eyes, to provide visual and sound simulations of the virtual reality experience. Virtual reality, in at least some embodiments, includes additional sensory input, such as haptic/tactile feedback to the user, where the feedback can simulate various interactions with the virtual reality.

In the embodiments described herein, the term "virtual reality" is intended to encompass either or both of virtual reality and augmented reality. mean either, or both, virtual reality and augmented reality, as their differences do not affect the present invention.

VR training and simulations, such as those that include VR, as currently used in some areas (e.g., military trainings) can have several shortcomings. For example, current virtual training systems can lack optimal and modular features to perform desired functions or provide desired features, such as collecting and transmitting mission data, recording data about both missions and environmental conditions associated with such missions, providing interoperability between various types of proprietary virtual training systems, providing cybersecurity and other types of security protections, preventing, detecting, and/or logging intrusions into the system and its data, providing ability to operate in closed environments, tracking environmental and other data during use to help ensure reliability and security of the system and for post-processing, analysis, etc.

VR and virtual training systems, especially those used by the military, are often proprietary and difficult to integrate with each other in a modular and easily configurable way. Such proprietary systems can be difficult to upgrade or customize. Further, because so many current systems are proprietary and do not easily connect in a modular way to each other and to various other types of computer systems, it can be difficult to run simulations that encompass multiple domains or that make use of formats (e.g., terrain formats), simulation devices, and/or simulation features (e.g., audio features, haptic feature) that are only available on certain simulation systems or which are configured and controlled differently by different simulation systems.

In many instances, simulations operate on closed, restrictive networks, are facilities-based, require high personnel overhead and feature multiple incompatible features such as varying simulation formats, audio and haptic features, environmental tracking, etc., that may require customized controls and conversion of incompatible commands. Reconfiguring commands and controls for haptics, audio, and visual information and/or modifying them to work with formats of different systems, can be expensive and time-consuming. It also can take multiple months to set up some types of simulations, such as live, virtual, constructive exercises, and often such simulations can only take place in certain predetermined physical locations. This limits the availability of training and its responsiveness to user needs and increases the time and expense of planning and running training and other activities in some types of simulation systems. It would be advantageous to provide existing simulation systems with the ability to convert communications, such as user inputs, commands and controls from legacy simulation scenarios, commands and/or messages from simulation software, into standardized instructions usable by a wide variety of simulation systems. In certain embodiments as described herein, by including a common interface board (CIB) as hardware that can be included in or installed in a wide variety of simulation devices, the CIB acts, in certain embodiments, as a development kit around which specific training devices can be built. The CIB, in certain embodiments, helps to provide the ability to enable varying types of simulation subsystems to adapt and respond to simulation scenarios, by converting instructions sent out in a uniform format, into commands and controls tailored to the haptics, audio, and visual capabilities of a given simulation system, and similarly converting user inputs into a standardized form.

In certain embodiments, the CIB acts as the "brain" of the physical training device. For example, in some embodiments, the CIB detects when the user takes an action, such as pressing a button, squeezing a trigger, extending an antenna, replacing a battery, etc., and translates that user input into a message that a connected computer system (such as a personal computer running a conventional operating system like Microsoft Windows) and the Simulation Software (e.g., which may be executing on that computer system) can process and understand. Advantageously, in some embodiments, whatever action is performed on the physical simulator (e.g., device simulator) will be mirrored in the simulation software because of this interaction through the CIB. Additionally, in certain embodiments, the CIB accepts commands or messages from the simulation software and outputs those messages as haptic events. For instance, if a user squeezes a trigger on a simulation device (e.g., a simulated weapon), in certain embodiments, the CIB will detect the trigger switch closing and send a signal to the simulation software (executing on a simulation computer subsystem that is in operable communication with the CIB) to "fire" the simulated weapon. The simulation software then sends a signal back to the CIB telling it to simulate weapon recoil (e.g., as a haptic effect). In response, the CIB activates vibration motors according to preprogrammed vibration profiles, to simulate weapon recoil. In certain embodiments, the CIB is configured to provides communications capabilities to enable "pass through" communications between third party devices (devices separate from the simulation system) and a connected communications system.

Further, in some environments, such as certain closed area systems, it may be necessary to communicate only via wired connections and not wireless connections, or be able to switch between both uses, but not all VR and simulation equipment has that flexibility. Because end users in high-fidelity training environments need a way to pass input and output data securely from physical training devices to compute solutions running virtual reality enabled training scenarios, if simulation components can only communicate in one way (e.g., only wirelessly, or only in a wired manner), it can limit the usefulness of those components.

Additionally, end users in high-fidelity training environments need a way to pass input and output data securely from physical training devices to compute solutions running virtual reality enabled training scenarios and to ensure data and other simulation information is not compromised. There are commercial off the shelf (COTS) components, such as circuit card assemblies, which can allow for physical user input to be translated into keystrokes for computer systems to use as input, but these are generally geared toward purely commercial applications designed to be low cost and proprietary, and do not operate with the reliability, security features, and configurability needed for applications such as military simulation systems.

The components of some types of simulation systems, especially military simulation systems, are costly and can have sensitive components, so ensuring reliability and that component are used properly and in the correct environments (e.g., only indoors, if a simulation device has that limitation) can be important. However, military simulation systems that are built or adapted from commercial off the shelf (COTS) VR equipment, often do not include any means of detecting if a device has been subject to improper or harsh environmental conditions during use, so it can be difficult to ensure reliability and plan for appropriate maintenance if there is not a way to track the environments to which simulation equipment has been exposed, to see if any impacts on reliability may result. Known systems also do not incorporate cybersecurity features which ensure component integrity and confidentiality, such as intrusion protection features, to keep data and other simulation information secure. As one of skill in the art will appreciate, data produced during simulations of weapons systems could be used to determine or derive information about the weaknesses and limitations of such systems, as well as revealing classified information (e.g., operating frequencies, secure passwords, encrypted information, etc.). For example, an enemy who gains possession of the weapons simulation devices of its opponent, can attempt to intrude into and/or reverse engineer, a given simulation subsystem, to attempt to discern how opponents' corresponding weapons systems works, which can be enough information to formulate a way to overcome and defeat the given weapons system. A bad actor could even attempt to use information gleaned from intrusion and/or reverse information associated with a first system, to attempt to gain access to a second system.

As the popularity of military simulation systems, including virtual reality systems, has increased, there is an increased need for a low-cost, cybersecure, modular interface device between a computer system and a piece of advanced training hardware. In certain embodiments as described further herein, an interface assembly is provided that helps to address at least some of the above-referenced concerns. The interface assembly is referred to herein, interchangeably, as a common interface board (CIB), interface circuit cart assembly (CCA), and "interface assembly."

The CIB helps to fill a need for a secure computer interface between a computer system and advanced training hardware and simulation systems, including but not limited to hardware, devices, and/or systems used in virtual reality training environments, synthetic environments, and synthetic training environments.

Figure 3A:
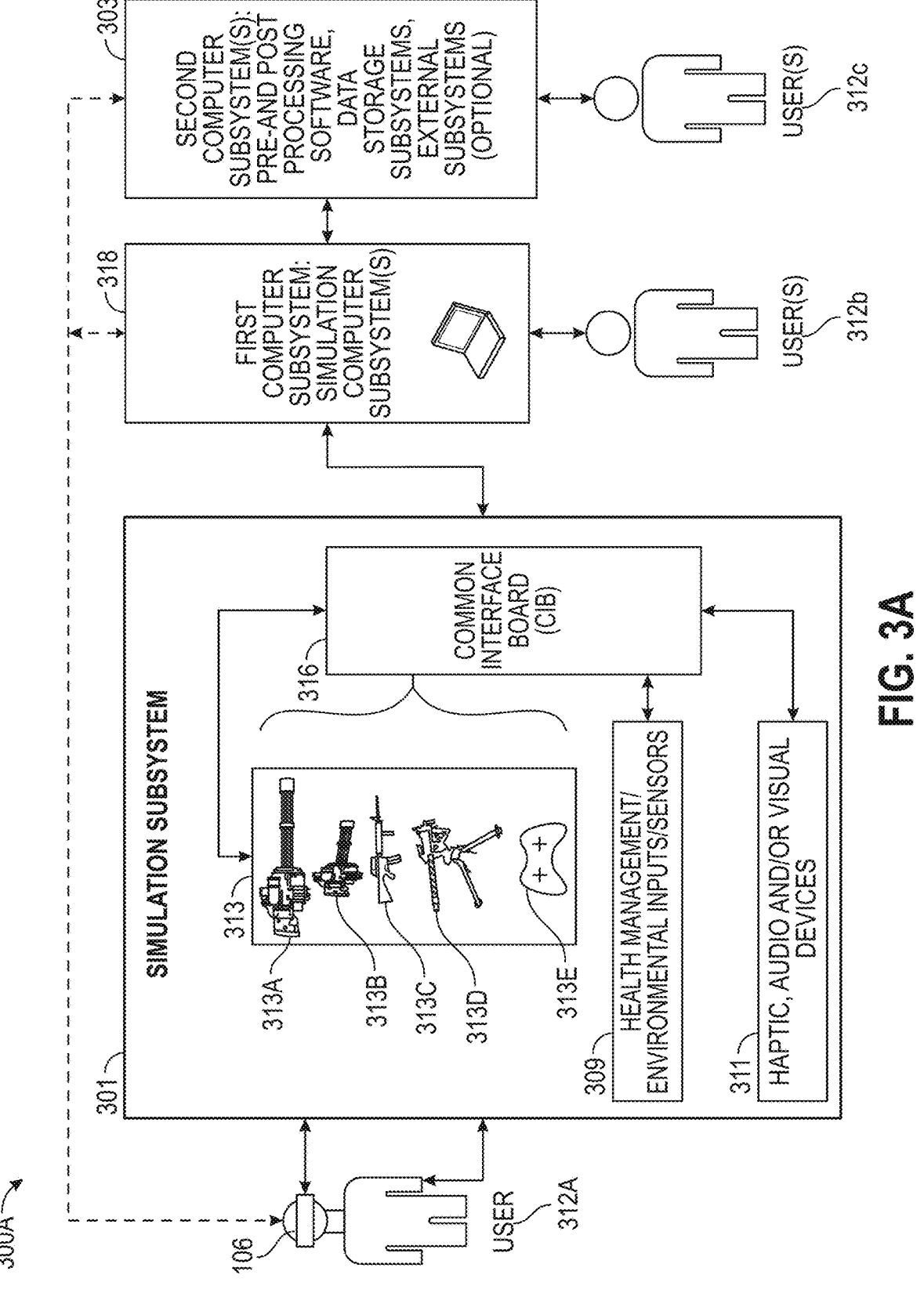
FIG. 3A is a first simplified block diagram of an exemplary system utilizing a common interface board (CIB), showing physical and logical interfaces between the CIB and other components of a simulation subsystem in accordance with one embodiment.
Figure 3B:
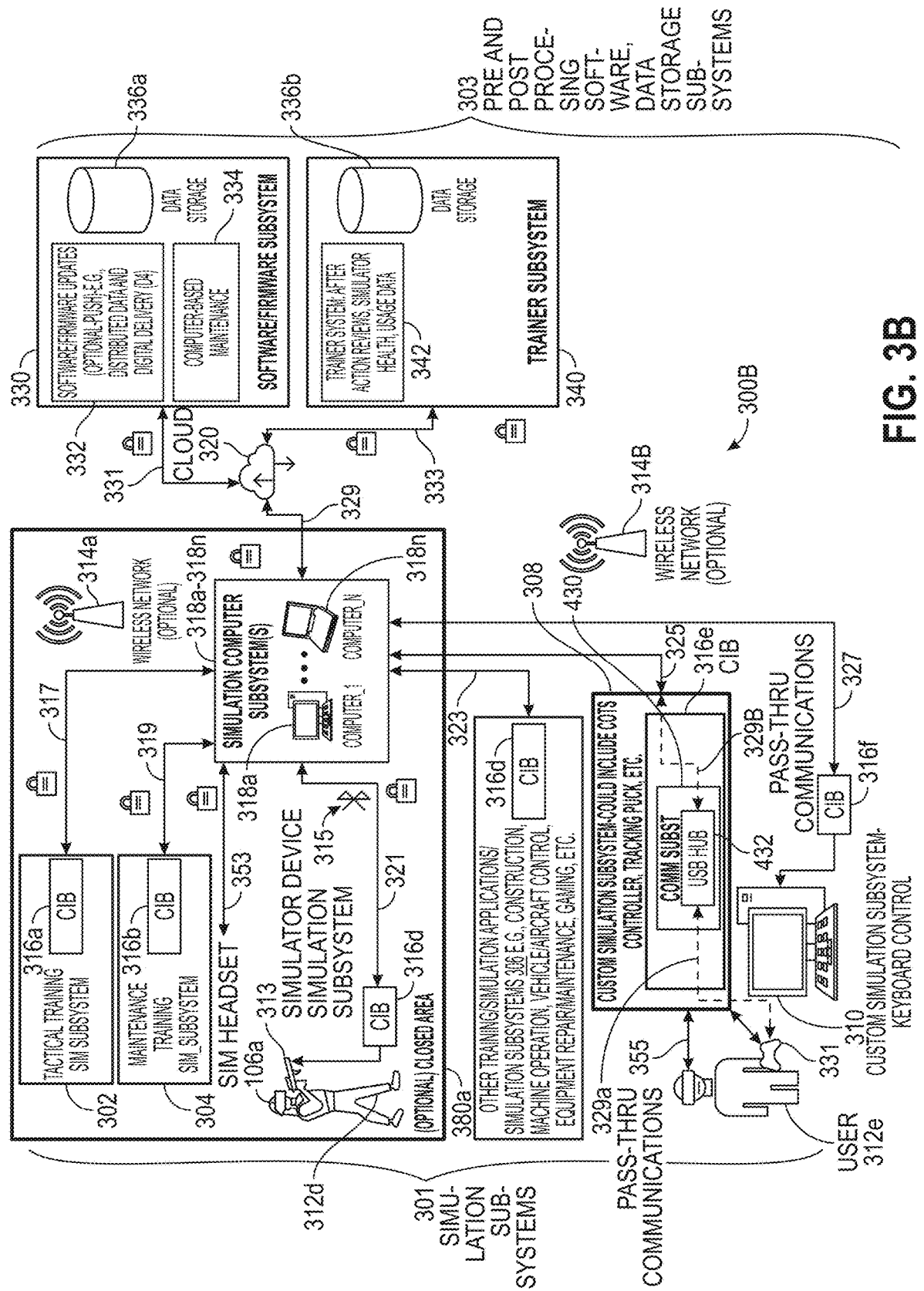
FIG. 3B is a second simplified block diagram of an exemplary system utilizing the common interface board (CIB) of FIG. 3, in accordance with one embodiment.
Figure 3C:
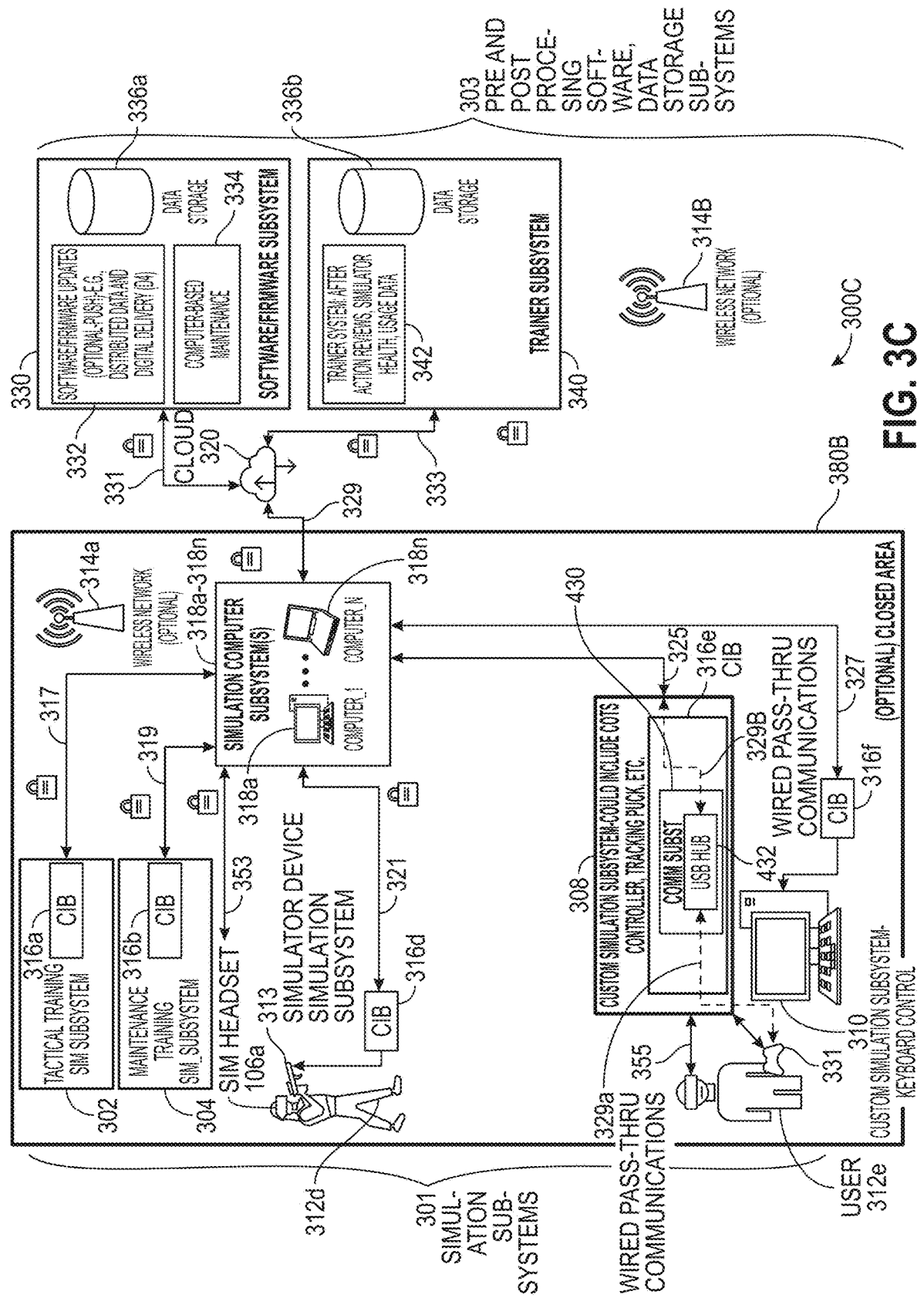
FIG. 3C is a third simplified block diagram of an exemplary system utilizing the CIB of FIG. 3, in accordance with one embodiment.

FIG. 3A is a high level block diagram of a first exemplary system 300 utilizing a common interface board (CIB) 316 (described further below in detail in connection with FIG. 4), showing physical and logical interfaces between the CIB and other components of a simulation subsystem 301 in accordance with one embodiment. FIG. 3B, described further herein as well, provides a more detailed block diagram of a second exemplary system 300B similar to the first exemplary system of FIG. 3A. FIG. 3C, described further herein as well, provides another more detailed block diagram of a third exemplary system 300C, similar to the first exemplary system of FIG. 3A, but showing an exemplary closed area configuration. FIGS. 3B and 3C each show the components of the high level block diagram 300 of FIG. 3A, in greater detail, showing in further detail the elements of each subsystem and interactions between the CIB 316 and other systems in the environment in which it will be operating. For example, as FIG. 3B shows, any one or more of the types of simulation subsystems 301 shown next to the left bracket, are usable as part of a simulation subsystem 301.

Referring to FIGS. 3A, 3B, and 3C, the system 300 includes one or more simulation subsystems 301 operably coupled to one or more first computer subsystems 318, which are used as the simulation computer subsystems 318. The first computer subsystem/simulation computer subsystem 318 is in operable communication with one or more second computer subsystems, which are used as further processing and storage subsystems 303. The simulation subsystem 301 (which may also include a computer system, as well) is the subsystem with which a first user 312a who is performing the simulation, typically interacts. Other users 312b, 312c of the system may interact with various parts of the system. For example, user 312b may interact with the simulation computer subsystem 318, and user 312c may interact with the second computer subsystem 303, and the first user 312a also, in some environments, optionally may interact with one or more of the other computer subsystems. In some embodiments, for example, it could be the same user interacting with multiple subsystems. Also note that, in some embodiments, users 312 can be physically remote from one or more of the subsystems with which they are interacting.

The first user 312a (and also users 312d and 312e in FIG. 3B), in some embodiments, interacts with the simulation subsystem 301 via VR goggles/headgear 106, a headset with a microphone (not shown, but well understood) and/or a simulation device 313, which could include any one or more types of simulator devices 313a-313f. For example, a simulator device 313 (also referred to herein as a simulation device 313) could include devices that simulate guns, shoulder-launched missiles (e.g., Stinger®), that simulate weapons like the Mk 153 Shoulder-Launched Multipurpose Assault Weapon, that simulate rocket propelled grenades (e.g., as described in commonly assigned U.S. Pat. No. 7,922,491, which is hereby incorporated by reference), In addition, as FIG. 3C shows, in some embodiments, a user 312e can interact with the simulation computer subsystem 318 via a custom or COTs device 331, such as a tracking puck or similar device (e.g., the VIVE tracker, available from HTC VIVE of Seattle, WA). Note that the examples of simulator devices 313 shown in FIG. 3A-3C are illustrative and not limiting. Further, the VR goggles/headgear 106, in some embodiments, can include a pair of smart glasses, smart visor or band, such as Google Glass, or any other device that includes a display capable of producing a VR and/or augmented reality image in a heads up device.

In some embodiments, the simulation subsystem 301 and its haptics, audio, and/or visual devices 311 are configured to stimulate sight/visual, sound and touch/haptics modalities. In some embodiments, as will be understood, sight provides a user a natural field-of-view and allows a user to see the simulation environment (e.g., a common synthetic environment (CSE)) from first person perspectives. Audio/sound enables a user to hear and provide voice input into the CSE. Touch/haptics allows the user to use physical and tactile controls of systems, subsystems, components, and mission command information system interfaces to interact with the CSE.

Figure 4:
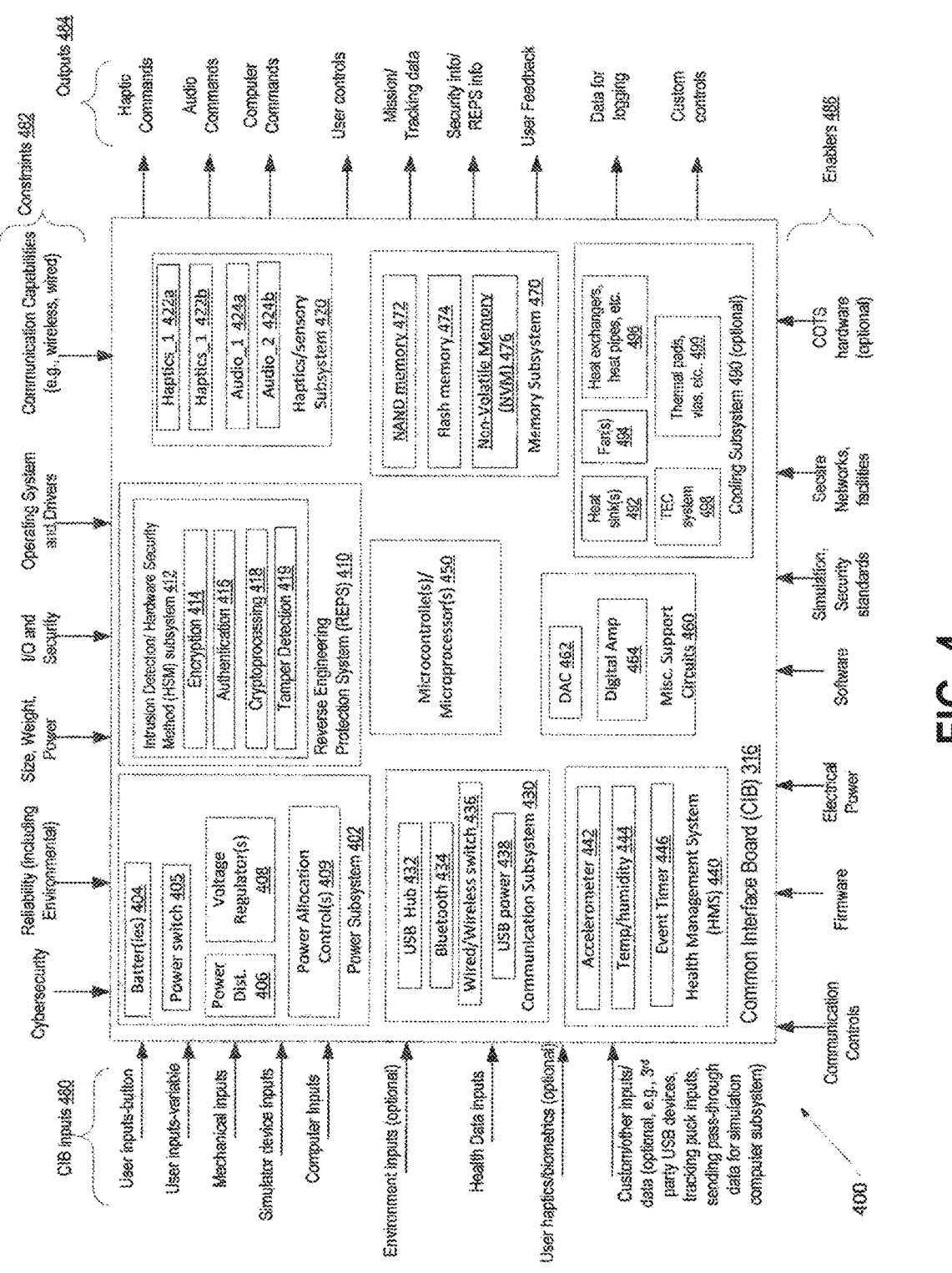
FIG. 4 is a block diagram of the common interface board (CIB) of FIGS. 3A-3b, in accordance with one embodiment.

Each respective simulation subsystem 301 includes a respective common interface board (CIB) 316 (described in greater detail in FIG. 4 herein). That is, in certain embodiments, each simulation device 313 includes its own CIB 316, which in some embodiments is housed within the simulation device 313 and is directly operably connected to the circuitry within the simulation device 313. In some embodiments, the first user 312a optionally may also interact with the simulation computer subsystem 318, e.g., to set up and run a simulation scenario.

The CIB 316, in the embodiment of FIG. 3A, represents an important interface between components of the exemplary general simulation system 301 and the rest of the environment (e.g., a synthetic training environment (STE)) in which it operates. For example, the exemplary simulation system 301 includes a simulator device 313, a plurality of health management/environmental input sensors 309, and one or more haptic, audio, and/or visual devices (e.g., the VR headset 106) 311. The health management/environmental input sensors 309 are able to sense and/or track environmental factors (including but not limited to temperature, humidity, movement, shock, and time) that can impact operation of, reliability of, and/or "health" of, the simulation subsystem 201. The plurality of haptic, audio, and/or visual devices 311 are responsive to received commands to produce various simulated effects for the user 312a during simulation, including but not limited to sounds, motion/vibration, visual effects, etc.

Figure 2:
FIG. 2 is an illustration of a prior art simulation system during use, in accordance with one embodiment.

Referring more particularly to FIG. 3B, the simulation subsystems 301, in various embodiments, include one or more of a tactical training subsystem 302, maintenance training subsystem 304, simulator device simulation subsystem 313, other training/simulation/applications subsystems 306, custom simulation subsystem with one of many different types of commercial off the shelf (COTS) controllers 308, such as a tracking puck 331, and/or a custom simulation subsystem with keyboard control 310. In some embodiments, the simulation subsystem 301 could be a commercial gaming system or virtual reality system. In some embodiments, a simulation subsystem 301 can be similar to the prior art simulator subsystems described in connection with FIGS. 1A-2. In some embodiments, the simulation subsystem can be similar to or adapted from, those described in any one or more of the following commonly assigned U.S. Pat. No. 10,198,957 ("Computer-Based Virtual Trainer;" U.S.

Pat. No. 8,662,892 ("Universal Hands-On Trainer"); U.S. Pat. No. 7,507,089 ("Methods and apparatus to provide training against improvised explosive devices"); U.S. Pat. No. 7,927,102 ("Simulation devices and systems for rocket propelled grenades and other weapons"); U.S. Pat. No. 7,922,491 ("Methods and apparatus to provide training against improvised explosive devices"); U.S. Pat. No. 8,157, 565 ("Military Training Device"); U.S. Pat. No. 9,011,151 ("System and method for simulating firing a gun"); U.S. Pat. No. 9,593,911 ("Blank firing simulated firearm for use in combat training"); U.S. Pat. No. 9,767,615 ("Systems and methods for context based information delivery using augmented reality"); U.S. Pat. No. 10,508,913 ("Environment recording system using virtual or augmented reality"); and U.S. Pat. No. 10,788,889 ("Virtual reality locomotion without motion controllers"). Each of these commonly assigned patents is hereby incorporated by reference.

It will be understood that any type of simulation subsystem 301 is possible as long as it can be operably coupled to the common interface board 316 (e.g., in some embodiments having the CIB 316 hard wired inside a simulator of the simulation subsystem 301) so as to allow physical inputs and outputs to be passed between a user 312, the simulation subsystem 301, and the simulation computer 318.

In FIG. 3B, each simulation subsystem that is interacting with the simulation computer subsystem 318, has its own respective CIB 316 that is configured to be responsive to various types of user inputs, as applicable to the system. For example, a tactical training subsystem 302 has CIB 316a, Maintenance Training subsystem 304 has CIB 316b, the first user 312a (wearing VW headpiece 106) carries a simulation device 313 having a CIB 316c that is operable connected to the simulation device 313, various other optional training/ simulation application subsystem 306 each will have a respective CIB 316d, an optional custom subsystem, such as a custom controller 308 or custom subsystem 310, each has a respective CIB 316e, 316f.

Referring still to FIG. 3B, the tactical training simulation subsystem 302 can be any type of simulation system 301 configured to enable a user to simulate being in tactical, warfare, and/or military type environment, including diverse types of scenarios of possible actions that could take place or be done in that environment, whether alone or with other users 312 also involved in a simulation in the same environment. The tactical training subsystem 302 can involve a user using weapons, but this is not required. For example, some tactical training simulation subsystems 302 may allow a user 312 to simulate driving or flying through an environment where others are using weapons, or investigating an area or building to look for things or people, while avoiding hazards in that area, or operating a replica radar system that monitors simulated targets to track, or repairing a piece of tactical machinery or a tactical vehicle or aircraft, etc. These examples are not, of course, limiting. Note, as well that users 312 of the tactical training subsystem 302 need not all be physically located in the same location, even if they are all in respective closed areas 380. As will be appreciated, the connections afforded using the CIB 316, the simulation computer subsystem 318, and the various wireless and wired communications arrangements (e.g., the cloud network 320 of FIG. 3B) are compatible with existing multiplayer and networked training scenarios (e.g., Common Operating Environment, etc.), so that users can conduct simulation scenarios anywhere in the world.

The maintenance training simulation subsystem 304 of FIG. 3B, in some embodiments, enables a user to practice performing maintenance related tasks on equipment, vehicles, aircraft, components, etc. The simulator device simulation subsystem 313, as shown in FIG. 3B, enables a user 312b to practice operating and firing a weapon.

Depending on the application, in some embodiments, the simulation subsystem 301 also can include one or more of many other simulation systems 306, such as those usable for simulating activities such as construction, machine operation, vehicle and/or aircraft control, equipment repair and/or maintenance, and, of course, gaming and other recreational uses. In some embodiments, the simulation subsystem 301 can be implemented using a custom simulation subsystem 308, making use of, e.g., a COTs controller (e.g., any type of gaming controller, joystick, steering well, mouse, etc.), where the custom simulation subsystem 308 is configured to have a respective CIB 316 connected as discussed herein. In some embodiments, the simulation subsystem 301 can be implemented using a computer system under keyboard control 310 (including on screen haptic keyboard), instead of using a separate simulation device 313, wherein the CIB 316f is incorporated as part of the computer system under keyboard control 310. For example, in some embodiments, the computer simulation system under keyboard control 310 could be a desktop computer, laptop computer, tablet computer, mobile communication device (e.g., mobile phone), etc., that is in operable communication with, or has installed therein, an appropriately configured CIB 316f.

The CIB 316 is a modular component, discussed further below (especially in connection with FIG. 4), which represents an interface between the user 312a, the simulation device 313 (also known as a training simulator 313) and the simulation computer subsystem 318 that hosts the simulation software. In certain embodiment, the CIB 316 serves as a "brain" that communicates the intent of the user 312a to the simulation subsystem 301 (which can be a virtual training simulator) in which the user is "immersed". The CIB 316 receives inputs from various sources (user, mechanical, computer) and outputs one or more signals corresponding to computer, haptic, and visual commands. In addition, in some embodiments, the CIB 316 receives from the simulation computer subsystem 318, data and information, such as software and firmware (including software and firmware updates), and, in some embodiments, information relating to control signals for the simulation subsystem 302 (e.g., haptics and audio signal), and other information the simulation subsystem 301 may need to schedule, run, modify, track, and/or record one or more simulation(s) being run.

In one embodiment, the CIB 316 is an assembly that is configured to pass commands between a simulation subsystem 302 (e.g., a physical training simulator 313 used by a user 312a) and a simulation computer subsystem 318 hosting a software simulation. The CIB 316 differs from commercial gaming options (e.g., boards inside conventional commercial gaming controller) in at least the following ways: the CIB 316 is configured to ensure cybersecurity rigor for usage in military-relevant environments; the CIB 316 has an on-board health management system (explained further herein), and; the CIB 316 is configured and designed to be adaptable to different security environments, including operating in classified spaces. This is further explained in greater detail below.

In some embodiments, the CIB 316 outputs computer, haptic, audio, and visual signals and/or commands that help to control, in part, how the simulation subsystem 301 operates, including how the simulation device 313 responds to user inputs, environmental inputs, and control signals that control the simulation scenario and also operates to determine how audio and visual information is provided to the user 312, via the simulation device 313, a simulation headset 106, a visual display (not shown in FIGS. 3A-3B but visible, e.g., in the exemplary simulation system of FIG. 2), or other simulation components, such as indicators (e.g., light emitting diode (LED) devices) that can provide information to a user. The simulation computer subsystem 318 sends inputs to the CIB 316 that are received (e.g., through a Bluetooth or wired connection, as shown in FIG. 3B) and translated into haptic or audio commands that are sent to components of the simulation subsystem 301 and/or the simulation device 313.

The capabilities of the CIB 316 of the systems of FIGS. 300A and 300B helps to enable a wide variety of types of simulation subsystems and simulation computer systems to be interoperable and to exchange information, especially relating to simulation scenarios, in a standardized and modular way. The CIB 316 also is configured to ensure that the simulation subsystem 301 adheres to specific requirements for training simulations, such as cybersecurity rigor for advanced training simulations, providing on-board health management functions for the simulation subsystem 301, providing an ability for the simulation subsystem 301 to be adaptable to different security environments (e.g., classified and non-classified spaces) and providing high levels of reliability for rugged applications such as military environments. Advantageously, in at least some embodiments, the CIB 316 is configured to be housed within the simulation device 313 associated with a given simulation subsystem.

The simulation subsystem 301 receives user inputs and/or information about user actions (e.g., buttons being pushed, weapons fired, user motion, etc.). In some embodiments, the CIB 316 can receive this information directly via operable connection to the buttons, e.g., in question; in some embodiments, circuitry within the simulation device receives the inputs and then forwards them to the CIB 316. The CIB 316 communicates the user input information, or information relating to the user input information, to the simulation computer 318. Note that FIG. 3B illustrates one or more respective computer subsystems 318a-318n, in communication with multiple respective CIBs 316a-316f, each associated with a respective simulation subsystem 301. That is, in the embodiment of FIG. 3B, each respective subsystem 301 is associated with its own respective simulation computer subsystem 218. In a further embodiment, the system 300B, in certain embodiments, can be implemented so that one simulation computer 318 serves multiple simulation systems 301 (e.g., multiple CIBs 316). In other embodiments, each simulation system 301 can communicate with a dedicated respective simulation computer subsystem 318.

As shown in FIG. 3B and also in FIG. 3C, some of the communications 317, 319, 353, 321, 329a, 329b between certain simulation subsystems 301 and the simulation computer subsystem 318, take place within an optional closed or secure area or perimeter 380 (e.g., within a secure training or maintenance facility, at least as previously defined), and at least some of these are shown with the "lock" symbol to indicate a secure communication. FIG. 3B shows a first closed area 380a, and FIG. 3C shows a second closed area 380b, wherein in FIG. 3C, the user 312a is using a tracking puck 331 as part of a custom simulation system 308. As shown in FIGS. 3A-3C, the communications between the simulation subsystems 301 and the simulation computer subsystem 318 may be wired (e.g., via USB-C) or wireless (e.g., via Bluetooth 315, if within appropriate distance and configuration, via wireless network 314, etc.) as described further herein. In some embodiments, the choice of wired or wireless communications can depend on the environment in which the simulation system 301 is used. In some embodiments, operation in certain closed areas 380b may require that all communications between the simulation system 301 and the simulation computer subsystem 318 be wired. In certain embodiments, the CIB 316 can be configured to be switchable between wired and wireless communication (e.g., via wired/wireless switch 436 as shown in FIG. 4, discussed further herein). Some other communications shown in FIG. 3B, such as communications 323, 325, 327, can be outside of the optional closed area 380, as well, and may not be required to meet the same security requirement as the secure communications 317, 319, 353, 321

In response to receiving communications from the CIB 316, the simulation computer 318 can communicate back appropriate responses to actions of the user 312, and the simulation computer 318 (and/or optionally the CIB 316) is configured to create, responsive to user inputs, the appropriate output controls/commands to control and/or respond to simulation actions, such as haptic commands, audio commands, visual/commands, and/or other computer commands that can control simulation components. In certain embodiments, the CIB 316 is configured to control all physical circuitry associated with responding to actions of the user 312, including having stored in memory thereon (see FIG. 4) information (e.g., profiles) needed to produce a desired simulated response. For example, consider a situation where the CIB 316 receives a trigger signal from the simulation computer subsystem 318. In response, the CIB 316 selects the appropriate vibration file from a library stored in memory and activates the appropriate haptics (e.g., vibration motors) according to the instructions in the profile. In certain embodiments, the CIB outputs 316 include outputs that not only to go places within the simulation subsystem 301 itself (e.g., to the simulation device 313) but also external to the system, such as communicating info on user commands, logs of simulation information, etc., to the simulation computer subsystem 318. This is described further herein, especially in connection with FIG. 4.

The CIB 316 also can communicate environmental information (e.g., information on temperature, humidity, simulator device drop shock, time) that the simulation subsystem and/or simulator device 313 have been exposed to and can communicate the information to the simulation computer subsystem 318. The environmental information is also referred to herein as health information, and such information can be obtained via sensors (e.g., those included as part of the CIB itself and/or as part of the simulation subsystem 301 itself), via external systems configured to provide that information (e.g., for information such as temperature and humidity, via external sensors or devices, via local weather information services, etc.). This information, in certain embodiments, also can be communicated from the simulation computer subsystem 318 to a second computer system 303 performing post-processing, to analyze and/or store results, although in certain embodiments, the simulation computer subsystem 318 can perform the post processing and store results itself, as shown in FIGS. 3B-3C and discussed further herein.

As shown in FIGS. 3A-3C, the CIB 316 is in operable communication with the simulator computer subsystem 318, which, in at least some embodiments, can be any type of computer system, including, for example, a laptop or tablet computer, a mobile phone, or any computer device similar to that shown and described in connection with FIG. 10 (described further herein). In certain embodiments, the simulation computer subsystem 318 performs all processing necessary for a given simulation, provides all data storage, performs all post-processing analysis, etc. The simulation computer subsystem 318, in certain embodiments, may be under user 312a control, under user 312b or 312c control, under automated control, under remote control, under the control of other users not depicted in FIG. 3, etc.

In certain embodiments, the simulation computer subsystem 318 is configured to transmit and receive information (e.g., via wired or wireless communications, as noted above, such as via wireless network 314b and/or via the cloud 320) to and from one or more second computer systems 303, which may or may not be remote to the simulation computer subsystem 318. In at least one embodiment, the simulation computer subsystem 318 is configured to communicate with, generally, a single other computer system at once, but is configured to be operable to communicate, at various times, with multiple different external systems, such as the soft-ware/firmware subsystem 330, trainer subsystem 340, non-tactical network 360, etc. The second computer subsystem 303 (described further below) also can be a computer system similar to that shown in FIG. 7. In some embodiments, one or more third users 312c interact with the second computer subsystem 303. As shown in FIGS. 3B and 3C, the second computer system 303, in certain embodiments, includes a software/firmware subsystem 330 and/or a trainer subsystem 340. Although not specifically depicted in FIG. 3B or 3C, to simplify the complexity of the figures, in at least some embodiments, components of the second computer system (e.g., the software/firmware subsystem 330 and/or the trainer subsystem 340 can be in operable communication with each other.

The one or more other second computer subsystems 303 include subsystems that can perform pre-processing, post processing, data storage, analysis, etc. For example, pre-processing, in certain embodiments, includes generating simulation scenarios that the simulation computer subsys-tem 318 will run, providing software and/or firmware updates to both the simulation computer subsystem 318, providing sufficient information to the simulation computer subsystem 318 to enable it to send appropriate haptics controls, audio controls, visual controls, etc. to the CIB 316 (including in response to user inputs/actions with the simu-lation device 313), so that the CIB 316 can adapt them to the needs/requirements of the simulation subsystem 301. Post-processing, in certain embodiments, can include performing one or more various types of post-simulation analysis, including but not limited to analysis of the simulation itself, (e.g., based on simulation data and/or logged data sent from the CIB 316 to the simulation computer subsystem 318), user data and responses, simulator health and usage data, reliability data, error logs, security and intrusions, etc., In some embodiments, the second computer system 303 can be an external subsystem that can include any entities that may have a need for or interest in information about the simu-lation.

FIGS. 3B and 3C includes illustrative examples of second computer subsystems 303 that can perform at least some of these functions. The software/firmware subsystem 330, in certain embodiments, includes a software/firmware updates module 332, a computer-based maintenance module 334, and data storage 336a. The software/firmware updates mod-ule 332 can optionally push distributed data via digital delivery. In certain embodiments, the software/firmware subsystem 330 implements a Distributed Data and Digital Delivery (so-called "D4") arrangement, which enables information generated by the simulator subsystem 301 to be utilized for analysis and troubleshooting purposes, e.g., by the non-tactical network 360 (discussed further below) Simultaneously, in certain embodiments, the D4 arrange-ment offers the capability for software embedded in the CIB 316 to be updated remotely, which in certain embodiments can help to respond to a discovered vulnerability, reducing overall risk of cyber exploitation. In certain embodiments, D4 allows for reduced mean time to patch software and for rapid response to vulnerabilities. In certain embodiments, the D4 arrangement provides an ability to know the health status of all fielded simulation systems 301 that utilize the CIB. 316.

In certain embodiments, the software/firmware subsystem 330 can implement automated date collections, as well, e.g., via telemetry offload (where telemetry is at least referring to the collection of measurements or other data at remote or inaccessible points and their automatic transmission to receiving equipment for monitoring). In certain embodi-ments, the software/firmware subsystem 330 provides fea-tures such as training material updates, maintenance data reporting, report distribution, and/or cyber auditing. Advan-tageously, in certain embodiments, the software/firmware subsystem performs its action in a platform-agnostic man-ner.

The trainer subsystem 340, in certain embodiments, includes data storage 336 and a module 342 configured to perform after action reviews, analyze and/or store simulator health data, and analyze and/or store use data . . . . In some embodiments, simulator subsystem 301 usage, exposure to adverse environmental conditions, reverse engineering attempts, and/or intrusions/security issues, are all logged and recorded on the CIB 316. The trainer subsystem 340 can use and analyze this information to improve the next generation of products, support warranty claims, and reduce vulner-ability of the simulation subsystem 301 and/or other com-ponents, to a cyber-attack or other types of attacks. In some embodiments, the trainer subsystem 340 (or other subsys-tems that receive collected information) can be configured to perform various types of analysis, e.g., Big Data analysis, e.g., to analyze data on simulations and make recommen-dations to tailor training done in simulations to optimize outcomes, implement predictive analytics, etc., as will be understood.

The types of interconnections and interoperability allowed by systems such as that of FIG. 300A-300B can enable a user 312 as well to benefit from after-action reviews even immediately after completing a simulation or even during the simulation (information coming as the action takes place, about the actions that just took place, for example). Consider an example where the simulation device 313 and the simulation subsystem 301 replicates the look, feel, and operation of a shoulder launched missile system like Stinger® (e.g., as shown via device 313b of FIG. 3A). The simulation device 313b provides the ability for a user to press buttons and configure other controls that simulate the operation of an actual weapon like Stinger® and then allow the user to see and hear a virtual missile launch and strike its target and to feel the vibration and launch of the Stinger® missile as the missile "leaves" the launch canister. In addi-tion, because the system 300B, in some embodiments, includes provisions for after action review of simulation and data analysis (as discussed previously), a user 312d can, for example, use a simulation device for practice, without an instructor, and then potentially get automated feedback from one or more of the second computer systems 303, sent to the simulation computer subsystem 318a and then to the simu-lation subsystem 301 via the CIB 316, such that post processing and other analysis that are automatically operably connected to the simulation device, via the CIB 316.

The feedback can be provided multiple ways, including via a screen display associated with the simulation subsystem 301 or simulation device 313, via audio or video, etc. The video can, for example, be provided separate from the simulation device 313 itself. For example, video could be shown on a smartphone in operable communication with and coupled to the simulation device (such an arrangement also could be used during the actual simulation, as will be appreciated). Further, the interconnections as shown in FIG. 3B mean that a given simulation subsystem can be connected to other simulation and training devices in a U.S. Department of Defense synthetic training environment (STE) or other high-level architecture networks. The CIB 316 helps to enable simulation subsystems to be modular and open for multiservice combined-arms training across a spectrum of virtual and augmented reality systems.

The simulation computer subsystem 318, in certain embodiments, sends commands and controls to the CIB 316 and receives from the CIB 316 information relating to user inputs, mechanical inputs, and hardware simulator inputs, that the CIB 316 receives. In one embodiment, the simulation computer subsystem 318 sends inputs to the CIB 316 that, once received, are translated into haptic or audio commands that are sent to components of the CIB 316 and to the simulator device 313 being used, so that the user 312 can experience them or use them during a simulation scenario. The communications between subsystems shown in FIGS. 3A-3C, and even between users 312 and subsystems (or even between users 312 and each other) can be in various ways, including, in certain embodiments, a wired connection, a wireless connection, or a combination of the two types. It also will be appreciated that users 312a, 312b, 312c also may communicate with each other via many different ways not specifically depicted in FIGS. 3A-3C, such as via mobile or landline phone, two-way radio transceivers (e.g., the so-called "walkie-talkie"), pagers, via proprietary headset communications, via voice over Ip (VOIP) protocol using computing devices, and/or via various in person communications.

For example, referring to FIG. 3B, the various simulation systems 302, 304, 306, 308, 310 (and user 312d) are in operable communication with one or more respective simulation computer subsystems 318a-318n. In certain embodiments, the simulation systems 302-310 may all be in communication with a single computer subsystem 318. In certain embodiments, the simulation subsystem 302-310 each may be in communication with a respective corresponding simulation computer subsystem 318a-318n. The communication can be wired or wireless, as noted previously, and can be via secure or non-secure networks, and/or within closed areas 380 or non-closed areas, depending on application and need. In the example embodiment of FIG. 3B, within the closed area 380a, the tactical training subsystem 302, maintenance training subsystem 304, and user 312d, all can be located in a closed area 380a and communicate via respective secure communications links 317, 319, 321, respectively, which may be wired (e.g., links 317, 319) or wireless (as in 321). For example, in some embodiments, the wired connections 317, 319 are implemented via a direct universal serial bus-C (USB-C and the third communications link 321 is via Bluetooth 315, but these are exemplary and not limiting. It is envisioned that any secure communications connections, wired or wireless, whether now known or developed in the future, will be usable to implement communications connections or links in accordance with at least some embodiments herein. Further, in at least some embodiments, a given communications link can be configured to use one or more types of encryption, including, by way of illustration and not limitation, including National Security Agency (NSA) or Federal Information Processing Standards (FIPS) approved encryption algorithms and standards, if needed. Note that in some embodiments, certain closed areas, e.g., closed area 380b of FIG. 3C, only wired communications may be allowed.

Suitable wired connections between the CIB 316 and the simulation computer subsystem 318 can include any type of cable or connection capable of sending data or information to and from a computer, including but not limited to any one or more of a universal serial bus (USB) connections (such as USB-C), FireWire, Ethernet, IEEE-488, small computer standard interfaces (SCSI), serial and/or parallel data cable connections, and/or any other connection now known or later developed that can provide a direct wired connection capable of allowing information/data to be exchanged between the CIB 316 of the simulation subsystem 301 and the simulation computer subsystem 318.

Suitable wireless connections between the CIB 316 and the simulation computer subsystem 318, in a preferred embodiments, is a 1:1 Bluetooth link, such that the CIB 316 and the simulation computer subsystem 318 are connected in that way and the CIB 316 does not have any other type of internet protocol (IP) connection. In addition, as those of skill in the art will appreciate, in some embodiments, depending on the security needs of the application and/or the operating environment, other possible network connections could be usable, including any one or more of a wireless local area networks (LAN), wireless metropolitan area networks (MAN) (e.g., so-called "Wi-Fi hotspots"), wireless personal area networks (PAN) (e.g., Zigbee, near-field communications (NFC), and even infrared in some instances), wireless wide area networks (e.g. mobile communications networks like LTE, 3G/4G/5G, etc.), a cellular network, a wireless (Wi-Fi) network, a radio frequency communication system, and/or any other suitable wireless communication method and/or any type of wireless connection now known or later developed that can provide a wireless connection capable of allowing information/data to be exchanged between the CIB 316 of the simulation subsystem 301 and the simulation computer subsystem 318, to the standards required by the application and operating environment. As will be appreciated, in certain embodiments, information need not be shared directly between two entities (where an entity can be a human user or a non-human user, such as another computer or a process running on a computer), but can instead be shared by uploading it (using whatever wired or wireless arrangement is available or suitable) to a secure location in the cloud, such that another entity can later access it for later viewing, use, storage, analysis, etc.

In certain embodiments, the wired and/or wireless connections are configured to help ensure that the CIB 316 helps to provide a layer of security via software assurance practices pertaining to CIB 316 board-embedded software development and proper configuration to ensure secure wireless communications via technologies such as Bluetooth. Software assurance seeks to shift the focus from software patches to the production of secure software. Secure coding practices, penetration testing and code analysis, and supply chain risk management all contribute to overall software assurance. In certain embodiments, the CIB 316 includes embedded software that is developed according to software assurance best practices.

In certain embodiments, wireless communications via Bluetooth, for the CIB 316, are defined by hardcoded board embedded software. In some embodiments, the components on the CIB 316 are configured and selected to result in a design configuration that guarantees both integrity and confidentiality of the pairing process to computer devices to which the CIB 316 sends information, such as the simulation computer subsystem 318 or any other computer subsystems with which the CIB 316 communicates, and overall communications thereafter. In certain embodiments, the CIB 316 is configured to support the most up to date, secure Bluetooth version. In certain embodiments, the CIB 316 includes modules providing protection from downgrading attacks which could force the CIB 316 to accept insecure version/protocol communications.

Those of skill in the art will appreciate that many different types of wired and wireless connections are usable and selection of a given type will depend at least in part on the particular application and configuration of the system 300 (e.g., distance between subsystems, environmental conditions, cost, type of devices being used, applicable military/commercial standards, security requirements, type of closed area, etc.).

Referring again to FIG. 3A-3C, as described further herein, in certain embodiments, the simulation computer subsystem 318 and CIB 316 also can perform mutual authentication and verification checks, as described further herein. This helps to ensure that verification of the integrity of the CIB 316 does not rest solely with the CIB 316 itself (e.g., verification that there have not been intrusions, damage, and/or other potentially harmful actions performed on the CIB 316 or on the simulation subsystem 301 in which it is operably coupled). The security and authentication features are described more fully below in connection with FIG. 4.

FIG. 4 is a functional block diagram 400 of the common interface board (CIB) 316 of FIG. 3, in accordance with one embodiment. In certain embodiments, the CIB 316 leverages as many commercial off the shelf (COTS) parts as possible to properly balance price and performance, but this is not limiting. In some embodiments, COTS hardware is usable in the CIB 316 so long as the hardware is capable of meeting the constraints of a given application, taking into account factors such as size, weight, power, and limited Inputs/Outputs (I/O). As those of skill in the art will appreciate, additional constraints can be placed on a given simulation subsystem 301 depending on the nature of its use, including but not limited to cybersecurity, reliability, and operating system constraints (e.g., a military environment vs. a manufacturing training environment vs a recreational environment, for example).

In certain embodiments, the CIB 316 is adapted primarily for indoor use, but this also is not limiting. In certain embodiments, the CIB 316 has security features (described further herein) enabling it to be granted Authority to Operate (ATO) in closed area spaces. In certain embodiments, the CIB 316 is designed so that it does not contain any classified components or hardware itself (even if it is able cooperate with simulation systems 301 to run simulations of classified systems).

As the exemplary block diagram 400 of FIG. 4 shows, the CIB 316 includes several subsystems. One subsystem, which includes the main operational circuitry of the CIB 316, includes the primary microcontroller/microprocessor(s) 450, a communications subsystem/module 430 (which in some embodiments includes a Bluetooth module 434), a haptics/audio subsystem 420 that includes haptics modules 422_*a*, 422_*b*, and audio modules 424*a*, 424*b*, along with a memory subsystem 470, and a power subsystem 402 that includes the power switch 405. Another subsystem provides a USB hub 432 to enable, in certain embodiments, a wired USB connection for closed-area data transfer and/or possible USB charging. In certain embodiments, the USB hub 432 allows data from third party devices such as a tracking puck (e.g., the tracking puck 331 of FIG. 3C) to also be transmitted in a wired configuration instead of over wireless communication. In certain embodiments, the USB hub 324 can enable "pass through" communications between a third party, USB-connectable device and the simulation computer subsystem 318, as shown in FIG. 3B via the pass through communications 329*a*, 329*b*. In certain embodiments, data also can be transferred over USB connection in non-closed area configurations. In certain embodiments, the CIB 316 also includes a health management subsystem 440 configured to measure temperature and humidity, simulator drop shock, and time. In certain embodiments, the CIB 316 also includes a reverse engineering protection system (REPS) 410, configured to provide several security features for the CIB 316. Each of these subsystems is explained further below.

While the simulation subsystem 301 and simulation device 131 that communicates with the CIB 316 varies by training product and the type of simulation subsystem, in certain embodiments, there is universal functionality that is incorporated into all training products. In certain embodiments, there is a customizable capability to tailor the CIB 316 to the type of simulation subsystem and/or simulation device 313, as will be appreciated. For example, in certain embodiments, the universal functionality associated with functions of the CIB includes, but is not limited to, functions such as:

Standard button and switch states (Examples include but are not limited to: on, off, open, closed, states that indicate event detection (e.g., trigger, safety), states that show continuous press (e.g., uncage), position change (e.g., potentiometer), rotational change (e.g., encoder), etc.) t;

Sensor Data (Health Management System sensor data, reliability thresholds)

Bluetooth or other wireless communication (unless in closed area configuration);

USB connection for data transmission in closed areas; note that wired connections such as USB also can transfer data in non-closed areas, USB connection for selected other functions such as battery charging, tracking puck charging, USB peripheral charging and/or updates, etc.

a timer for power-on time and battery saving mode (in certain embodiments, this functionality is implemented as part of the health management system, described further herein);

Power allocation control and high and low power levels for the I/O pins customizable functionality including but not limited to features such as: Simulator-specific button and switch states; haptic and audio feedback The universal functionality is described further herein.

Referring to FIGS. 3A-3C and 4, the CIB 316, in certain embodiments, receives plurality of CIB inputs 480, such as, mechanical, and hardware simulator input through a wiring harness (not shown, but readily understood) that is operably coupled directly to the CIB 316 from the simulator system 313 or simulation device 313 in which it is installed. The CIB 316, in certain embodiments, receives electrical power (shown as one of the constraints 486 in FIG. 4), such as via a USB cable coupled from the CIB 316 to a power source. Wiring between components on the CIB 316 enables the board to send computer commands wired or wireless connection, to other subsystems, such as the simulation computer subsystem 318. The inputs to the CIB 315 from the computer subsystem 418 (e.g., shown in FIG. 4 via the CIB input 480 of computer inputs, via some of the enablers 486, including but not limited to the communication controls, firmware, software, and simulation security standards, and via one or more of the constraints 482, including operating system and drivers. As noted previously, the simulation computer subsystem 318 sends inputs to the CIB 316, which can be received via wired or wireless connection, which inputs are translated into haptic and/or audio commands that are sent to components of the CIB 316 and the simulation subsystem 301 (including the simulator device 313). These data flows are depicted in FIG. 5, which is an exemplary block diagram showing basic data flows in an exemplary simulation system 500 having a common interface board, in accordance with one embodiment.

Figure 5:
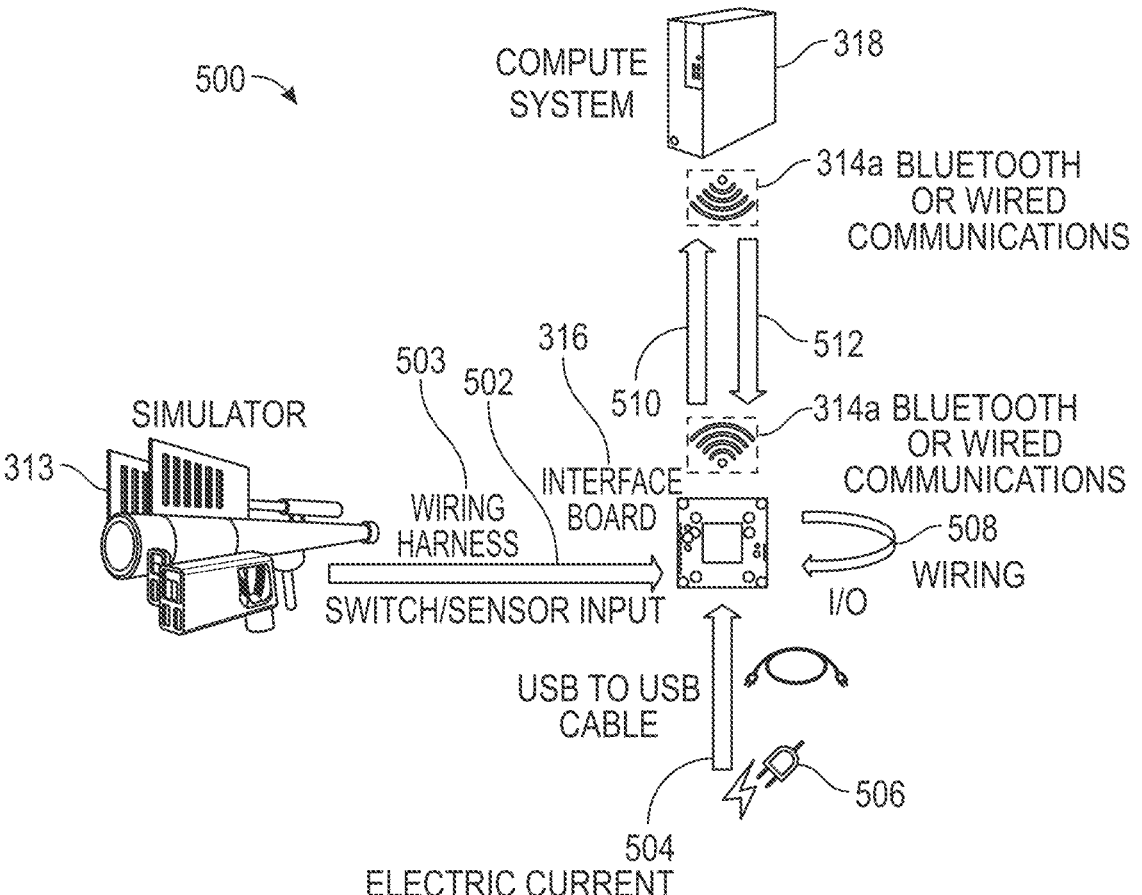
FIG. 5 is an exemplary block diagram showing data flows in an exemplary simulation system having a common interface board, in accordance with one embodiment.

Referring briefly to the example system 500 of FIG. 5, it can be seen that the exemplary simulation device 313 communicates switch and sensor inputs 502 via wiring harness 503 to the CIB 316 (which, in certain embodiments, is located within the simulator device 131). The CIB 316 (also referred to in this Figure as "interface board" and in this document as "interface assembly"), is powered by electric current received via a USB to USB cable 504 that is coupled to a source of electric current 506 (e.g., wall plug). Wiring 508 within the CIB 316 enables the CIB 316 to communicate switch and sensor inputs 510 to a computer system 318, via Bluetooth or wired connection 314a and to receive haptic and/or audio inputs 512 at the CIB 316 from the compute system 318.

Referring again to FIGS. 3A-3C and 5, the CIB 316 subsystems will now be briefly described. In one exemplary embodiment, the CIB 316 includes a power subsystem 402, a reverse engineering protections subsystem (REPS) (also referred to herein as a security subsystem 410) a haptics subsystem 420, a communications subsystem 430, a health management system 440, a microprocessor or microcontroller 450, miscellaneous support circuits 460, and a memory subsystem 470.

The power subsystem 402 includes one or more batteries 404, a power distribution system 406, one or more voltage regulators 408, and one or more power allocation controls 409. In certain embodiments, the CIB 316 operates on allow voltage direct current (DC) system capable of driving two to four haptic, audio, and/or visual devices at the same time. The power subsystem 402 is not unlike a standard power subsystem on any circuit card assembly (CCA) and provides similar functionality to provided necessary voltage and current, as needed, to all components of the CIB 316. The power allocation controls 409 help to control high and low power levels for input/output pins of the CIB 316. Electrical power for the power subsystem can come from either or both of the batteries 404 and/or external power input to the CIB 316 (shown as one of the constraints 486). One of skill in the art will appreciate that, depending on the simulator subsystem 301 and/or the associated simulator device 313, a given CIB 316 may require its power subsystem 402 (and possibly other subsystems of the CIB 316) to require cooling, as shown via the optional cooling subsystem 490 (described further herein). In at least some embodiments, however, cooling for the CIB 316 may come from other parts of the simulation subsystem 301 to which it is connected.

The Reverse Engineering Protection system (REPS) 410 is a system configured to help detect if an intrusion into the simulator subsystem 301 takes place and includes, in at least some embodiments, an intrusion detection system/a Hardware Security Method (HSM) subsystem, 412, an encryption system 414, and an authentication subsystem 416. In certain embodiments, the REPS 410 is configured to address (e.g., detect, log, and/or mitigate) at least one of (and advantageously both of) logical and physical reverse engineering attempts and/or intrusions. Physical intrusions include at least any action(s), whether manual, automated, or any combination, which involves physical access to the CIB as well as, in certain embodiments, physical intrusions into a simulation system in which the CIB is located, including but not limited to physical intrusions that cause harm or damage, such as attempts to destroy, alter, change, and/or access (other than in an authorized manner), physically, any component(s) or subsystems of the CIB 316. Logical intrusions include at least any action configured to cause damage without a requirement of physical access to the CIB 316 or simulation system in which the CIB is located, such as damage caused to the software and data without any physical damage to the CIB 316, attacks on a logical operational flow of the CIB 316, etc. In some embodiments, for example, the REPS system 410 is configured to help support the investigation of any issues with the simulation system 301 (e.g., performance issues, simulation problems, reliability issues, incorrect operation, warranty claims, etc.) that may arise due to situations, environments, simulation scenarios, software and/or hardware upgrades and/or modifications, user behavior, and/or any other actions, especially those that that result, whether intentionally or not, from improper intrusion into the simulator system 301. Improper intrusion can occur from many different kinds of actions, events, and situations, including but not limited to:

if an entity attempts to remove, disassemble, or otherwise obtain information about components of the simulation system 301 in an attempt to "reverse engineer" one or more components;

improper attempts to download data from the simulation subsystem 301;

attempts to alter or replace components, firmware, and/or software of the simulation system 301 in an attempt to sabotage operation, install malware/spyware, or as part of improper maintenance or repair;

installing extra components on simulation system to change operation or to maliciously track simulator system 301 operations;

system abuse or neglect, such as failing to perform required maintenance, improperly performing maintenance, using the system in an improper environment (e.g., using an indoor-only simulator subsystem 301 outdoors), spilling liquids on a simulation subsystem 301, dropping or throwing or otherwise "shocking" a simulator subsystem 301 that was not designed for those forces or for excessive vibration, etc.;

exposing a simulator subsystem 301 to environments other than those for which it was designed or for which it does not have proper weather protection, such as temperature extremes, moist or wet environments (e.g., dropping a simulator subsystem 301 in water), exposing to snow or ice, exposing to blowing sands and/or salty sea air.

In certain embodiments, a focus area for identifying threats and vulnerabilities to the CIB 316 and to the systems in which it is operating, is the so-called Initial Access phase of exploitation. The CIB 316, in certain embodiments, helps to prevent initial unauthorized access or manipulation of the CIB 316 to be used for either lateral movement into the broader training environment OR exfiltration of IP/proprietary information. In certain embodiments, security considerations for the CIB 316 take into account whether an attack on the CIB 316 could be local (e.g., an attack on the Bluetooth communications, which could require physical proximity) or remote (which would be more an indirect type of attack). In another example another type of attempted intrusion/attack could be an attack/intrusion that results from supply chain compromise. such as a supply chain attack impacting hardware or software critical to the operation of the CIB).

In certain embodiments, the CIB 316 (and, effectively, any subsystem in which it is installed) will remain within a physically secure location, such as a physically secure location within a military installation, a closed area (e.g., as defined previously), etc., Security measures known in the art, such as guns, guards, gates, and physically secure storage procedures, can help to reduce a chance of physical external attack to the CIB 316. Additional policy such as secure storage can further mitigate the risk of physical exploitation, as will be understood.

In at least some embodiments, to help support of overall security of the CIB 316 as well as reverse engineering protection, and/or to alleviate some or all of the above concerns, the REPS system 410, along with the rest of the design of the CIB 316, is configured to help ensure board/assembly integrity. Configuring the design of the CIB 316 to ensure board integrity, in certain embodiments, can include choosing components and connecting them to ensure that physical, boot-level, data storage, device pairing, communications, and update integrity are all verified. In addition, ensuring confidentiality and integrity of communications that the CIB 316 is responsible for, is an important consideration in the operation of the REPS 410 and in the overall design of the CIB 316 . . . . Confidentiality and integrity are a high priority for communications which the board is responsible for, including wireless communications (primarily over Bluetooth) and wired communications (e.g., USB-C).

In certain embodiments, as part of the REPS 410 system, the CIB 316 includes an Intrusion Detection/Hardware Security Method (HSM) 412 that is configured to provide security and provide reverse engineering protection functionality. In some embodiments, the HSM 312 is implemented using one or more commercially available circuits/modules that provide the necessary tools to accomplish all levels of system security from physical integrity to communications security. For example, in one embodiment, the HSM subsystem 412 is implemented at least partially using a physical computing device that safeguards and manages digital keys, performs encryption 414 and decryption functions for digital signatures, strong authentication 416. As is understood in the art, circuits exist that can serve as "trust anchors" to help protect the cryptographic infrastructure by securely managing, processing, and storing cryptographic keys inside a hardened, tamper-resistant device. An exemplary HSM subsystem 412 can, in certain embodiments, include dedicated hardware to help implement some of these features, such as via one or more secure cryptoprocessor chips. In certain embodiments, the HSM subsystem 412 can be configured to leverage other capabilities in the CIB 316, such as the microcontroller/microprocessor 450, to provide encryption, authentication, and/or cryptoprocessing functionality. In certain embodiments, the HSM subsystem 412 is configured have one or more features providing tamper detection 419 and/or tamper evidence such as visible signs of tampering or logging and alerting, or tamper resistance which makes tampering difficult without making the HSM 412 subsystem inoperable, or tamper responsiveness such as deleting keys upon tamper detection.

As noted above, the cryptoprocessing function 418, in at least some embodiments, can be implemented via functionality provided either as part of the HSM subsystem 412 (e.g., via a dedicated component) or, for example, via operations taking place in the microcontroller/microprocessor 450 and/or a Bluetooth 434 module. In certain embodiments, cryptoprocessing 418 is configured to prevent tampering and bus probing. Note that, and in some embodiments, the HSM subsystem 412 itself is protected by the tamper evident, tamper resistant, or tamper responsive packaging. In some embodiments, the HSM 412 cooperates with other components, like the microcontroller/microprocessor 450, to help to safeguard and manages digital keys for strong authentication. As noted herein, in some embodiments, commercially available components can implement at least some hardware security functions, and an illustrative example of a COTS hardware security apparatus usable with at least some embodiments of the CIB 316 includes (but is not limited to) the HSM4 device available from Zymbit of Santa Barbara, CA.

In some embodiments, the presence of an HSM subsystem 412 enables the CIB 316 to be configured to the appropriate level of security while providing additional configuration options as unique deployments demand more stringent security measures. In some embodiments, a function of some parts of the HSM subsystem 412 cooperates with the microcontroller/microprocessor 450 to serve as a Root of Trust (RoT) for the CIB 316, to help allow for authenticated updates, secure boot, and secure device pairing. Additionally, in certain embodiments, the HSM 412 cooperates with the microcontroller/microprocessor 450 to allow for local secure storage of public/private key pairs to allow for verification of signed embedded software.

In certain embodiments, the security protections that the REPS 410 subsystem provides complies with the Risk Management Framework NIST 800-53 Rev 5, which is a standard for Security and Privacy Controls for Information Systems and Organizations, put out by U.S. Department of Commerce's National Institute of Standards and Technology (NIST). In certain embodiments, requirements specified in this document help to define requirements applicable to the CIB 316 and/or the environment in which it operates, such as a system with a categorization of High Confidentiality, Integrity, and Availability. These security requirements represent the highest possible level of security requirements and, in certain embodiments, can be tailored down to Moderate categorization according to specific deployments and applications of the systems and components described herein, such as the CIB 316. This document includes, for example, requirements that can be tailored that pertain to data and communications integrity/confidentiality, access control, authentication, auditing, software assurance, supply chain security, and reverse engineering protection. Those of skill in the art will appreciate that the components and systems described herein, such as the CIB 316, need not meet all applicable security controls in all embodiments. In certain embodiments, for example, the CIB 316 is categorized in between a peripheral and full-scale mobile device to achieve the proper level of security.

Referring again to FIG. 4, the CIB 316 also includes a haptics/sensory subsystem 420, including a plurality of haptics components 422a, 422b and audio components

424*a*, 424*b*. Although the term "haptics subsystem" or "sensory subsystem" is used to describe this subsystem, it will be understood that the haptics/sensory subsystem 420 is not limited solely to providing haptics feedback to a user, but also can provide other user experiences and feedback, including audio and visual user feedback and experiences. In at least some embodiments, the haptics/sensory subsystem 420 is configured to provide a simulated user experience to a user 312, the simulated user experience configured to engage one or more of the senses (e.g., sight, sound, touch, smell, etc.) of the user 312 by causing a device to simulate something that a given sense can detect. In at least some embodiments, a haptics subsystem 420 may not even provide actual haptics, or may not provide just haptics, but may instead be a sensory subsystem 420 configured to be able to provide controls to provide multiple user experience feature simulations, which may or may not include haptics, and which may or may not include other sensory simulations, such as audio and visual simulations. As noted herein, the simulation computer subsystem 318 sends inputs to the CIB 316 that are received via wired or wireless connection and translated into haptic or audio or other sensory commands that are sent to components of CIB 316 and the simulation subsystem 301.

The CIB 316 receives CIB inputs 480 from various sources (user, mechanical, computer, simulator, environmental, health data, etc.). For example, in certain embodiments (e.g., as shown in FIGS. 3A-4B), the simulation subsystem 301 includes a simulation device 313 that the user 312 can at least partially control and interact with, such as by depressing buttons, pulling a trigger, directing it in a certain direction, flipping a switch, moving a lever or joystick, speaking a command, etc., and in response to user interactions with the simulation device 313, the translated haptic, audio, or video commands are sent to the simulation subsystem 301 to control the simulation experience to the user 312*a*, including providing haptic effects to a user (e.g., vibration), or specific sounds or imagery to the VR headset 106, etc. In addition, in certain embodiments, inputs to the CIB 316 can include haptic information from or relating to devices or sensors that a user 312*a* may be wearing (e.g., information from or associated with clothing with sensors, such as a multiple integrated laser engagement system (MILES) device configured in a piece of apparel as described in commonly assigned U.S. Pat. No. 8,157,565, which is hereby incorporated by reference) or even biometric sensors configured to track particular user data (e.g., a heart rate or body temperature of a user). Based on the haptic info from users, or other user interactions, additional new haptics may be sent back to the user, or information can be recorded, or aspects of the simulation can change, etc., as will be understood.

For example, if the simulation device 313 replicates the look, feel, and operation of a shoulder launched missile system like Stinger® (e.g., as shown via device 313B), the simulation device 313 provides the ability for a user to press buttons and configure other controls that simulate the operation of an actual weapon like Stinger® and then allow the user to see and hear a virtual missile launch and strike its target, to feel the vibration and response as the Stinger® launcher simulates the action happening when the missile "leaves" the launcher.

Referring again to FIG. 4, in some embodiments, the CIB 316 further includes a health management system (HMS) 440 configured to monitor one or more environmental characteristics associated with the physical environment in which the simulation system 301 is operating, where the environmental characteristics can include, for example, motion, temperature, humidity, and/or time. In some embodiments, the HMS 440 includes one or more of a motion/orientation/position device or sensor such as an accelerometer 442, systems to receive environmental inputs such as temperature and humidity 444, and an event timer.

Motion sensors, as is known, can be configured to measure acceleration forces and rotational forces along three axes, and can include devices such as accelerometers, gravity sensors, gyroscopes, and rotational vector sensors. In certain embodiments, the accelerometer 442 (or other motion orientation device) is configured to detect motion of the CIB 316 and, thus, the motion of any simulation device 313 and/or simulation subsystem 301 in which it is installed. The accelerometer 442 can, for example, detect if damaging drops and other shocks ("drop shock") take place. As will be appreciated, other types of motion detecting components also are usable to accomplish a function of detecting motion and detecting certain types of motion, including but not limited to the aforementioned devices but also altimeters, inertial measurement units (IMU), magnetometers, barometers, compasses etc.

In certain embodiments, a position sensor can be usable to detect motion in a different way (e.g., by computing relative positions and then determining a difference, though not necessarily as a function of time). Position sensors, as is understood, measure the physical position of a device. This category includes orientation sensors and magnetometers. In the CIB 316, position sensors can be usable, in connection with other information (e.g., a timer) to derive acceleration and other measurements that can help to determine if the CIB 316 (and hence the simulation device 313) was subject to certain types of events, such as drop shock.

The environmental input component 444, includes, in certain embodiments, one or more environmental sensors configured to measure one or more environmental parameters, such as ambient air temperature and pressure, salinity, illumination, and humidity. This category includes barometers, photometers, and thermometers. In some embodiments, these types of sensors may be separate from the CIB 316 and may provide inputs to the CIB 316. In some embodiments, these devices may be included as part of the CIB 316.

The event timer 446, in certain embodiments, can record elapsed time and can be used to match up time with when certain events took place, such as particular simulation events, environmental events (e.g., temperature extreme, a drop shock event), time between relative positions (to help derive motion information), provide a timer for auto-shut off and time on battery (such as to track power-on time and battery saving mode), provide timing functions that the simulation subsystem 301 can use (e.g., the time of simulation events, time between weapons firings, time for user to respond) and the like.

In further embodiments, those of skill in the art will appreciate that, in certain simulations and depending on the simulation subsystem in which the CIB 316 is installed, other types of environmental factors can be tracked as well, depending on the needs of the application, such as light levels (e.g., via illumination sensors), and the information from these sensors (or any sensors) can be used by other parts of the CIB 316. For example, the aforementioned REPS system 410 may be able to look at a log of events detected by an illumination sensor and/or a humidity sensor 44 and determine that a simulation device 313 in which the CIB 316 was installed, has been opened, or a sealed unit in which the CIB 316 has been installed, has had its seal broken.

Referring again to FIG. 4, the CIB also includes a memory subsystem 470 that includes, for example, memory such as NAND memory 472, flash memory 474, and non-volatile memory (NVM) 476 (e.g., to provide a device to log data and simulation information). In at least some environments, the memory subsystem 470 includes components storing instructions that the microcontroller/microprocessor uses for operation of the CIB 316. For example, the CIB 316, in certain embodiments, uses an elapsed-time recorder device (e.g., event timer 446) with collected data being stored in non-volatile memory (e.g., NVM 476) even if the CIB 316 is not active. In certain embodiments, if an event occurs while the CIB 316 is inactive (e.g., an attempted intrusion), the CIB 316 will store information about the event in memory (e.g., NVM 476) until the board is activated at which point it will write the event(s) to a device on the CIB 316 used to record the CIB's log. For example, in some embodiments, the log is stored in NAND flash memory 472, and can be temporarily stored on the microcontroller/microprocessor 450 until the microcontroller/microprocessor 450 can write it to the NAND 472.

Referring again to FIG. 4, the CIB 316 includes one or more microcontrollers and/or microprocessors 450 that control operations on the CIB 316. In one embodiment, for example, two microcontrollers maybe used. In one embodiment, a single microcontroller is used. Examples of usable microcontrollers, in at least some embodiments, include (but are not limited to), the SAMX8 microcontroller and the ATSAMD21G18 microcontroller, both available from Atmel of San Jose, CA, and/or the STM32F439 microcontroller, available from ST Microelectronics of Geneva, Switzerland. Those of skill in the art will appreciate that many types of microcontrollers and/or microprocessors can be configured to be used on the CIB 316.

The CIB 316 also, in some embodiments, can include miscellaneous support circuits 460, such as one or more digital-to-analog (DAC) converters 462, digital amplifier(s) 464 as will be appreciated by those of skill in the art.

Optionally, in some embodiments, the CIB 316 can include its own cooling subsystem 490 For example, the cooling subsystem 490, in some embodiments, includes one or more elements configured to ensure that the components on the CIB 316 do not overheat, such as one or more heat sinks 492, fans 494, heat exchangers/heat pipes, etc. 496, a thermo-electric cooling (TEC) system 499, and/or built in thermal features 499 on the circuit board of the CIB 316 itself, such as thermal pads, vias, specific patterns or paths of routing wiring/traces, and even the type and thickness of a board used with the CIB 316, can help with cooling, as will be understood by those of skill in the art. In some embodiments, the CIB 316 also relies, in whole or in part, on external cooling provided by other devices in the environment or simulation subsystem 301 or simulation device 313 in which it is installed. For example, in some embodiments, the CIB 316 does not require its own cooling and does not include the cooling subsystem 490 and can instead utilize the cooling available in the environment or system in which it is installed.

In certain embodiments, the CIB 316 is to be configured to be extensible and employ a Modular Open System Architecture (MOSA) strategy. Advantageously, embodiments described herein can be implemented in synthetic training environments (STE) such as the Common Operating Environment (COE). In some embodiments, the COEreplaces or supplements current "boxy" simulators-which fill huge rooms with screens, sensors and projectors—by laptop-powered virtual reality headsets that users (e.g., soldiers) can use to train anywhere, at any time, whether in an open environment or a closed environment. For example, some embodiments disclosed herein are configured to work in common operating environments that are developed for simulation operations, such as the Raytheon Technologies INSTINCT® common operating environment. Common operating environments like INSTINCT® offer military agencies warfighting capabilities as software applications. The INSTINCT® environment is configured to replicate realistic terrain and targets and to enable users (e.g., service members) to train cooperatively and remotely from anywhere in the world. In some embodiments, the techniques and devices described herein are usable in other STE environments, such as cloud enabled STE environments, to enable the entire system to be accessible whenever and wherever it is needed.

In certain embodiments, as noted herein, the CIB 316 is configured to be able to be granted the Authority to Operate in closed area spaces, including closed areas at least as defined previously. In certain embodiments, the primary method of being able to operate in this mode is the termination of any wireless communication features. FIG. 3B, described above, depicts a plurality of simulation subsystems 301, each with a respective CIB, operating in a closed area 380b. As will be understood by those of skill in the art, in a closed area configuration embodiment of FIG. 3B, there is a secure wired connection between the CIB 316 and the simulation computer subsystem 318, wherein the simulation computer subsystem 318 of the closed area configuration performs authorization, monitoring and provides updates. In an exemplary closed area configuration example embodiment (e.g., the closed areas 380a of FIG. 3A and/or 380b of FIG. 3C) the CIB 316 is placed in a wired mode, and it communicates back to the simulation computer subsystem 318 via host computer through a hard-wired interface, such as a USB-C interface.

In addition, in certain embodiments, not only can data from the CIB 316 be sent to the simulation computer subsystem 318, but also, because of the USB HUB circuitry 432, other separate USB-wired party devices, e.g., third party devices such as a tracking puck 331 (FIG. 3B) or other devices with an associated USB dongle or connector, can have data sent (via the USB connection from the dongle/connector to the USB hub 432) as a pass through for communications between the third party device and the simulation computer subsystem 318 and/or can have two-way pass-through communication with the simulation computer subsystem 318. Use of some types of tracking pucks as part of a VR simulation system is described, for example, in commonly assigned U.S. Pat. No. 10,788,889, which hereby incorporated by reference. Use of tracking pucks and/or other separate USB-connected devices is illustrated for one exemplary embodiment in FIG. 3B, wherein the CIB 316e of the custom simulation subsystem 308 is configured to enable pass through communications 329a, 329b (shown in dotted lines) between a tracking puck 331 and the simulation computer subsystem 318. All functionality in terms of the human system interface, health management system, and cybersecurity remains intact in the closed area configuration. In certain embodiments, when the CIB 316 is in a wired configuration, a USB dongle for wireless communication, may not be needed if a tracking puck is used, because communication is handled via the wired USB connection pass through.

In contrast, in an exemplary non-closed area example embodiment, it can be seen that the simulation computer subsystem 318 receives pushed firmware/software updates from the external database 336a (e.g., as shown in FIG. 3B), e.g., wirelessly via wireless network 314a and/or the cloud 320A, and also provides after action reviews and/or simulator health and usage data for storage on the database system 336A. In certain embodiments, the CIB 316 is not itself considered to be classified hardware, even if it is located in a closed area; rather, the CIB 316 can adapt its communications (e.g., wired (e.g., USB-C) or wireless (e.g., Bluetooth)) to operate properly in the environment (classified/closed vs non-classified/open) in which it is disposed.

Figure 6:
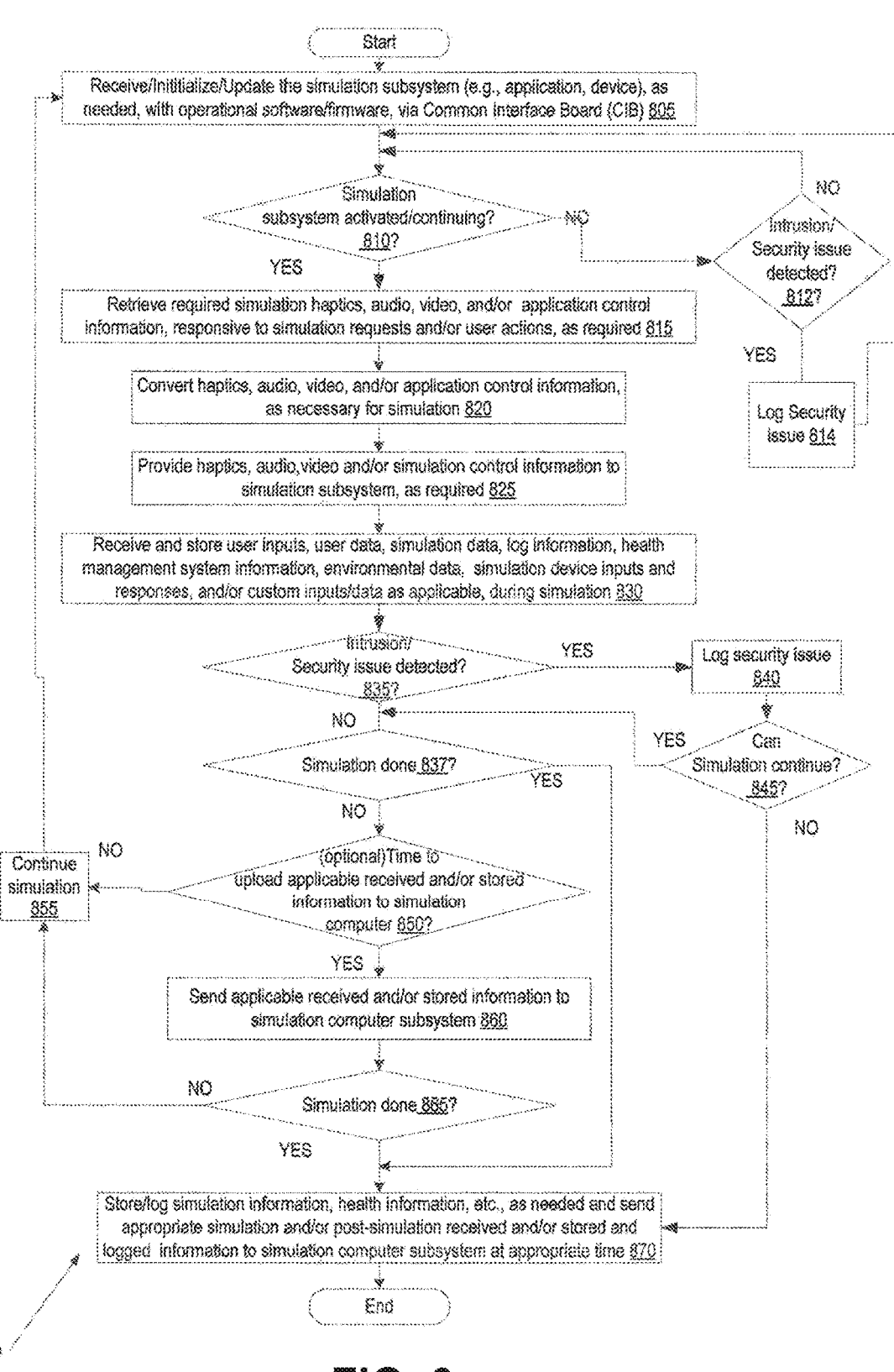
FIG. 6 is a flow chart showing an overview of operations, interactions, and data flow for the common interface board of FIGS. 3-7, in accordance with one embodiment.

FIG. 6 is a flow chart 800 showing an overview of operations, interactions, and data flow for the common interface board (CIB) 316 and simulation system 301 of FIGS. 3A-5, in accordance with one embodiment. Referring to FIGS. 3A-4 and FIG. 6, the CIB 316 receives applicable software/firmware to initialize and/or update the simulation subsystem 301 (block 805) as needed. Simulation begins (and/or continues) when simulation subsystem 301 activity is detected as starting or continuing in a check made at block 810, such as via actuation of the power switch 405. In addition, simulation subsystem 301 activity that can be detected includes, but is not limited to, various user 312 actions, such as pressing a switch or trigger. However, even before simulation begins, intrusion attempts can be detected. Thus, even if the answer at block 810 is NO (simulation has not yet begun, e.g., power not turned on, or simulator device 313 is on but no simulation action occurring), the CIB 316 monitors to check if there is an intrusion or other security issue (e.g., attempted intrusion) detected (block 812). If the answer at block 812 is YES, then the security issue is logged (block 814) and processing goes back to wait and check at block 810 if the simulation subsystem is activated and/or continuing to be used. If the simulation is activated and/or continuing (answer at block 810 is YES), not that intrusion and/or security issues are still checked (block 835, described further below).

In response to simulation requests and/or user actions, the required simulation haptics, audio, video, and/or application control information, are retrieved, such as by the CIB 316 (block 815). At the CIB 316, the haptics, audio, video, and/or application control information is converted, as necessary, for the simulation (block 820) and then provided for the simulation (block 825). During the simulation, the CIB 316 receives and stores user inputs, user data, simulation data, log information, health management system information, environmental data, simulation device inputs and responses, and/or custom inputs/data, as applicable (block 830).

During the simulation, if an intrusion or other security issue (e.g., attempted intrusion which was not successful) is detected (block 835) it is logged (block 840). A check is made regarding whether the simulation is able to continue after the intrusion (block 845). If YES, processing goes back to block 837. If NO, processing moves to block 870, where the CIB 316 sends appropriate simulation and/or post simulation received, stored, and/or logged information to the simulation computer subsystem.

Figure 7:
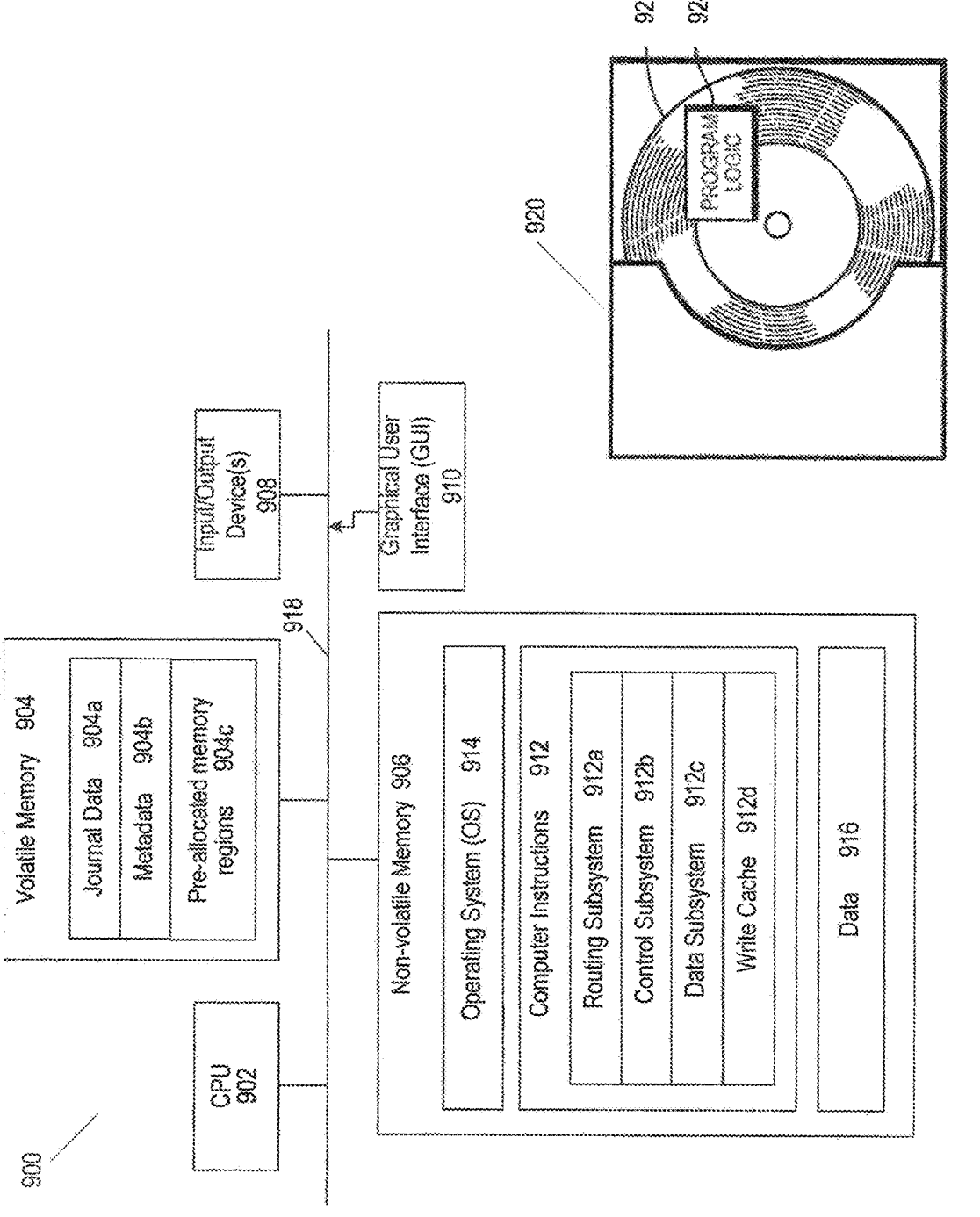
FIG. 7 is a block diagram of an exemplary computer system usable with at least some of the systems, components, boards and apparatuses of FIGS. 1-6, in accordance with one embodiment.

Referring back to block 835, if no intrusion or security issue was detected in block 835 (answer is NO ats block 835), or if security issues were logged (block 840) and simulation can continue (answer at block 845 is YES), then processing moves on to check if simulation is done (block 837). If it is done (answer at block 837 is YES), then processing moves to block 870 (described previously). If simulation is not done (answer at block 837 is NO), then, optionally, a check is made to determine if it is the time to upload applicable received, and/or stored information on the CIB 316, to the simulation computer subsystem 318 (block 850). For example, this determination can be made based at least in part on a predetermined elapsed time, if one or more predetermined events take place, if storage on the CIB 316 is full, if the simulation is configured to have uploads periodically, if a message is received requesting stored data, etc. If the answer at block 850 is NO, then the processing moves on to continue the simulation (block 855) and loops back to block 805 where the system processing optionally checks for updates before moving on to check if the simulation is continuing (block 810) etc. If the answer at block 850 is YES, then the applicable received and/or stored information is sent to the simulation computer subsystem (block 860), which can then send or push it, as required, to the second computer system 303 (FIG. 3A) or other databases (FIGS. 6, 7).

A check is made to see if simulation is done (block 865). This can be determined in many ways, such as if activity with the simulation pauses for some predetermined period, if power is switched off, if a time elapses, if some predetermined condition arises. For example, in the simulation scenario, the predetermined condition can include things such as:

a user 312 completes the simulation mission;

the simulation mission changes or switches, whether via control of the user 312 or responsive to some other signal, condition, and/or command;

an external command is received to end the simulation (this could, for example come from an instructor running the mission, another entity or application authorized to send commands to start and stop the mission, etc.);

the user 312 chooses to end the simulation;

an action during the simulation mission occurs which corresponds to the end of a user's actions during the mission (e.g., the user is "injured" or "killed" during the simulation, mission or "escapes out of" or "leaves" an environment associated with a given simulation mission), etc.).

If the answer at block 864 is NO, then processing continues to block 855. If the answer at block 865 is YES, then processing moves to block 870. In block 870, simulation information, health information, etc., is logged and stored as needed and the appropriate simulation and/or post-simulation information, and any other appropriate received and/or stored and logged information, is sent to simulation computer subsystem at appropriate time.

It is envisioned that any or all of the embodiments described herein and/or illustrated in FIGS. 3-7 herein could be combined with and/or adapted to work with many currently existing simulation systems and devices as well as those developed in the future. In addition, those of skill in the art will appreciate that the embodiments described and claimed herein and illustrated in FIGS. 3A-7, similarly could be combined with and/or adapted with many different systems, devices, and technologies described in multiple commonly assigned U.S. patent applications and patents, including but not limited to commonly assigned U.S. Pat. No. 10,198,957 ("Computer-Based Virtual Trainer;" U.S. Pat. No. 8,662,892 ("Universal Hands-On Trainer"); U.S. Pat. No. 7,507,089 ("Methods and apparatus to provide training against improvised explosive devices"); U.S. Pat. No. 7,927, 102 ("Simulation devices and systems for rocket propelled grenades and other weapons"); U.S. Pat. No. 7,922,491

("Methods and apparatus to provide training against impro-vised explosive devices"); U.S. Pat. No. 8,157,565 ("Military Training Device"); U.S. Pat. No. 9,011,151 ("System and method for simulating firing a gun"); U.S. Pat. No. 9,593,911 ("Blank firing simulated firearm for use in combat training"); U.S. Pat. No. 9,767,615 ("Systems and methods for context based information delivery using augmented reality"); U.S. Pat. No. 10,508,913 ("Environment recording system using virtual or augmented reality"); and U.S. Pat. No. 10,788,889 ("Virtual reality locomotion without motion controllers"). Each of these commonly assigned patents is hereby incorporated by reference.

It should be understood, however, that the disclosed embodiments are not limited to use with the any recited simulation systems/programs. The embodiments described herein have numerous applications and are not limited to the exemplary applications described herein. It should be appreciated that such references and examples are made in an effort to promote clarity in the description of the concepts disclosed herein. Such references are not intended as, and should not be construed as, limiting the use or application of the concepts, systems, arrangements, and techniques described herein to use solely with these or any other systems.

FIG. 7 is a block diagram of an exemplary computer system usable with at least some of the systems and methods of FIGS. 1-8, in accordance with one embodiment. In some embodiments, the computer system 900 of FIG. 7 can be usable as the simulation computer subsystem 318, for any one or more of the second computer systems 303, and as part of any simulation subsystem 301 and/or simulation device 313. Reference is made briefly to FIG. 7, which shows a block diagram of a computer system 900 usable with at least some embodiments. The computer system 50 also can be used to implement all or part of any of the methods, equations, and/or calculations described herein.

As shown in FIG. 7, computer 900 may include processor/CPU 902, volatile memory 904 (e.g., RAM), non-volatile memory 906 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 910 (e.g., a touchscreen, a display, and so forth) and input and/or output (I/O) device 908 (e.g., a mouse, a keyboard, etc.). Non-volatile memory 904 stores, e.g., journal data 904a, metadata 904b, and pre-allocated memory regions 904c. The non-volatile memory, 906 can include, in some embodiments, an operating system 914, and computer instructions 912, and data 916. In certain embodiments, the computer instructions 912 are configured to provide several subsystems, including a routing subsystem 912A, a control subsystem 912b, a data subsystem 912c, and a write cache 912d. In certain embodiments, the computer instructions 912 are executed by the processor/CPU 902 out of volatile memory 904 to implement and/or perform at least a portion of the systems and processes shown in FIGS. 1-6. Program code also may be applied to data entered using an input device or GUI 910 or received from I/O device 908.

The systems, architectures, and processes of FIGS. 1-7 are not limited to use with the hardware and software described and illustrated herein and may find applicability in any computing or processing environment and with any type of machine or set of machines that may be capable of running a computer program and/or of implementing a simulation system (including, in some embodiments, a simulation system that is part of an STE). The processes described herein may be implemented in hardware, software, or a combination of the two. The logic for carrying out the methods discussed herein may be embodied as part of the system described in FIG. 7. The processes and systems described herein are not limited to the specific embodiments described, nor are they specifically limited to the specific processing order shown. Rather, any of the blocks of the processes may be re-ordered, combined, or removed, performed in parallel or in serial, as necessary, to achieve the results set forth herein.

Processor 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a micro-controller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 7, the machine becomes an apparatus for practicing one or more of the described embodiments. When implemented on one or more general-purpose processors, the program code combines with such a processor to provide a unique apparatus that operates analogously to specific logic circuits. As such a general-purpose digital machine can be transformed into a special purpose digital machine. FIG. 7 shows Program Logic 924 embodied on a computer-readable medium 920 as shown, and wherein the Logic is encoded in computer-executable code configured for carrying out the reservation service process of this invention and thereby forming a Computer Program Product 922. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiments, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Throughout the present disclosure, absent a clear indication to the contrary from the context, it should be understood individual elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, and/or or a data signal. Within the drawings, like or related elements have like or related alpha, numeric or alphanumeric designators. While the disclosed embodiments have been discussed in the context of implementations using discrete components, including some components that include one or more integrated circuit chips), the functions of any component or circuit may alternatively be implemented using one or more appropriately programmed processors, depending upon the signal frequencies or data rates to be processed and/or the functions being accomplished.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the invention must comprise more than one of that element, nor is it intended by illustrating a single element that the invention is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing and illustrating the embodiments herein, in the text and in the figures, specific terminology (e.g., language, phrases, product brands names, etc.) may be used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments. Having described and illustrated at least some the principles of the technology with reference to specific implementations, it will be recognized that the technology and embodiments described herein can be implemented in many other, different, forms, and in many different environments. The technology and embodiments disclosed herein can be used in combination with other technologies. In addition, all publications and references cited herein are expressly incorporated herein by reference in their entirety.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

What is claimed is:

1. An assembly comprising:
   a processor in operable communication with a memory, the memory storing instructions for operation of the processor, the processor configured to convert first instructions received from a computer system into control signals to operate a simulation system in accordance with a first simulation scenario, wherein the processor is responsive to user actions and is operable to control the first simulation scenario running on the simulation system based at least in part on the user actions;
   a communications system in operable communication with the processor and the computer system, the communication system configured for controlling communications between the simulation system and the computer system and configured to provide at least one of wired and wireless communication between the assembly and the computer system;
   a sensory subsystem in operable communication with the processor, the sensory subsystem configured to provide commands to the simulation system to enable the simulation subsystem to provide a simulated user experience to the user, wherein, the simulated user experience is configured to engage one or more senses of the user with a simulation that the respective one or more senses detect;
   a health management system in operable communication with the processor and configured to monitor health event information relating to one or more characteristics that impact operation of, reliability of, or health of the assembly; and
   a security system in operable communication with the processor and configured for monitoring security events associated with the assembly, the security events related to at least one of physical and logical intrusion into the assembly, said security system including a reverse engineering protection system (REPS) configured to protect the assembly from at least one of physical intrusion into the assembly and a logical intrusion into the assembly;
   wherein the assembly is configured to interface between the simulation system and the computer systems.

2. The assembly of claim 1, further comprising a log configured to store event information the stored event information comprising information associated with at least one of the simulation events, health events, and security events.

3. The assembly of claim 2, wherein the processor is configured to provide stored event information in the log to the computer system for analysis of the first simulation scenario.

4. The assembly of claim 3, wherein the processor is configured to receive from the computer system second instructions for operating the simulation system in accordance with a second scenario, wherein the second scenario is created based at least in part on the analysis of the stored simulation information in the log that was provided to the first computer system.

5. The assembly of claim 2, wherein the processor is configured to provide stored security event information in the log to the computer system for analysis relating to detection of intrusion into at least one of the assembly and communications to and from the assembly.

6. The assembly of claim 2, wherein the processor is configured to provide stored health event information in the log to the computer system for analysis relating to detection of one or more health events associated with usage of the simulation system.

7. The assembly of claim 1, wherein the assembly is configured to be disposed within a simulation device of the simulation system.

8. The assembly of claim 1, wherein the simulation system comprises at least one of a virtual reality (VR) system, an augmented reality system, and a system operable within a synthetic training environment (STE).

9. The assembly of claim 1, wherein the communications subsystem is configured to be switchable between wired and wireless communication.

10. The assembly of claim 1, wherein the assembly is contained within a first device of the simulation system and wherein the communications system of the assembly is operably coupled to a second device distinct from the first device, wherein the communications system is configured to enable the second device to have pass through communications with the computer system.

11. The assembly of claim 10, wherein the communications system is operably coupled to the computer system via a first wired connection and the second device is connected to the communications system so as to ensure that communications from the second device are to the computer system are provided only via the first wired connection.

12. The assembly of claim 1, wherein the processor is configured to analyze both the health information and the security events to generate one or more output that investigate one or more of performance issues, simulation problems, reliability issues, incorrect operation, and warranty for the assembly.

13. The assembly of claim 1, wherein the security system comprises a hardware security method subsystem that comprises at least one of an encryption system, an authentication system, and a tamper detection system.

14. The assembly of claim 1, wherein the security system is configured to cooperate with the processor and the communications system to provide a Root of Trust (RoT) for the assembly.

15. A method, comprising:
   providing an assembly configured as an interface between a computer system and a simulation system, the assembly configured to be physically part of the simulation system;
   converting, using the assembly, first instructions received from the computer system into control signals to operate the simulation system in accordance with a first simulation scenario, wherein the simulation system is responsive to user actions and is configured to provide a simulated user experience to the user, wherein, the simulated user experience is configured to engage one or more senses of the user with a simulation that the respective one or more senses detect;
   configuring, using the assembly, communications between the simulation system and the computer system, to provide at least one of wired and wireless communication between the simulation system and the computer system;
   monitoring events associated with the assembly, the events comprising health event information relating to one or more characteristics that impact operation of, reliability of, or health of the assembly; and security events associated with the assembly, the monitoring configured to detect at least one of physical and logical intrusion into the assembly;

protecting the assembly from at least one of physical and logical intrusion into the assembly.

16. The method of claim 15, wherein the monitoring of events takes place during at least one of operation of the simulation system and during times when the simulation system is not operating.

17. The method of claim 15 further comprising operating the simulation system in accordance with a second scenario, wherein the second scenario is created based at least in part on an analysis of the monitored event information.

18. An assembly for interfacing between a simulation system and a computer system, the assembly for interfacing comprising:

means for converting first instructions received from the computer system into control signals to operate the simulation system in accordance with a first simulation scenario, wherein the means for converting is responsive to user actions and is operable to control the first simulation scenario running on the simulation system based at least in part on the user actions;

means for controlling communications between the simulation system and the computer system, the means for controlling further configured to provide at least one of wired and wireless communication between the assembly and the computer system;

means for providing commands to the simulation system to enable the simulation subsystem to provide a simulated user experience to the user, wherein, the simulated user experience is configured to engage one or more senses of the user with a simulation that the respective one or more senses detect;

means for monitoring health event information relating to one or more characteristics that impact operation of, reliability of, or health of the assembly that impact operation of, reliability of, or health of the assembly;

means for monitoring security events associated with the assembly, the security events related to at least one of physical and logical intrusion into the assembly; and means for protecting the assembly and communications to and from the assembly from at least one of physical and logical intrusion.

19. The means for interfacing of claim 18, further comprising means for storing event information, the stored event information comprising information associated with at least one of the simulation events, health events, and security events.

20. The method of claim 15, further comprising processing both the health event information and security events to generate one or more outputs that investigate one or more of performance issues, simulation problems, reliability issues, incorrect operation, and warranty for the assembly.

21. The assembly of claim 18, further comprising:

means for processing both the health event information and security events to generate one or more outputs that investigate one or more of performance issues, simulation problems, reliability issues, incorrect operation, and warranty for the assembly.

\* \* \* \* \*